United States Patent [19]

McGivern et al.

[11] Patent Number: 5,748,466

[45] Date of Patent: May 5, 1998

[54] ADAPTABLE CONTROL SYSTEM FOR A VARIABLE NUMBER OF SWITCHES

[75] Inventors: Patrick T. McGivern, Peoria; Bradley S. King, Princeville; Steven Graham, Peoria, all of Ill.

[73] Assignee: L. R. Nelson, Peoria, Ill.

[21] Appl. No.: 525,256

[22] Filed: Sep. 8, 1995

[51] Int. Cl.[6] .................................................. G05B 11/01
[52] U.S. Cl. .................... 364/146; 364/140; 364/145; 364/143; 364/137; 239/63; 239/64; 239/66; 239/70
[58] Field of Search .................................. 364/146, 140, 364/420, 143, 145, 510; 380/9; 239/632, 643, 691, 695, 700, 701, 706; 137/78.3

[56] References Cited

U.S. PATENT DOCUMENTS

| | | | |
|---|---|---|---|
| 4,209,131 | 6/1980 | Barash et al. | 137/78.3 |
| 4,423,484 | 12/1983 | Hamilton | 364/420 |
| 4,646,224 | 2/1987 | Ransburg et al. | 364/143 |
| 4,852,802 | 8/1989 | Iggulden et al. | 239/64 |
| 4,937,732 | 6/1990 | Brundisini | 364/145 |
| 4,952,868 | 8/1990 | Scherer, III | 324/664 |
| 5,005,005 | 4/1991 | Brossia et al. | 340/604 |

(List continued on next page.)

FOREIGN PATENT DOCUMENTS

| | | |
|---|---|---|
| 2665051 | 7/1990 | France . |
| 2680629 | 8/1991 | France . |

OTHER PUBLICATIONS

Nelson Pro 8430, 8420, 8900 Controllers, pp. 28–31, L.R. Nelson 1995 Catalog and Advertising Flier Pro 8430 and 8420 Series Irrigation Controllers 1991.

Oasis Controls Landscaper Irrigation Controller 12 and 16 Stations Issue No. OSS–005B Oasis Controls, 1992.

Oasis Controls PTC81 Professional Turf Controller 6 station, Issue No. OSS–006A(SP), 1992.

Oasis Controls PTC82 Professional Turf Controller 12 and 18 stations, Issue No. OSS–007A(SP), 1992.

Oasis Conrols PTC83 Professional Turf Controller 24, 30, 36, 42 stations, Issue No. OSS–008A(SP).

"Researchers Develop Automated Surface Irrigation System", NTIS Tech Note, Dialog Summary 1995.

Maxicom Computer Control System Brochure, published by Rain Bird, 1990.

DRP, MA CP Controller from Moody Corporation, 1984.

Buckner Modular Series Electronic Controllers, pp. 47–49, 1993.

Specification pp. for XKIT Expander Module Kit, Solatrol Inc. Feb. 1995.

Weather–matic 1990–91 Irrigaton Equipment Catalog, pp. 6–7 Symflex 1000 Command Satellite System 1990.

Buckner, Irrigation Equipment Catalog, pp. 39–42 36300 Series Central and Field Controller System, 1993.

Toro 1990 Irrigation Products Catalog, pp. 36–37 Toro Network 8000 Computerized Central Satellite Control System, VT Series Large Turf Controllers 1990.

*Primary Examiner*—Reba I. Elmore
*Assistant Examiner*—Ramesh Patel
*Attorney, Agent, or Firm*—Mayer, Brown & Platt

[57] ABSTRACT

An adaptable controller for controlling variable numbers of switches is disclosed. Specifically the controller is useful in an irrigation system having a number of water sprinklers whose operation may be controlled by user-defined programs. The system has a processor unit, an interface unit and a number of add-on units. Switches for actuating electrically-operated devices such as sprinklers are located on the interface unit and the add-on units. The controller allows a user to enter operating parameters relating to the switches in the form of the user-defined programs. The processor is capable of ascertaining the number of switches on the interface unit and the add-on units and limiting the number of switches selected and controlled by the user-defined programs.

36 Claims, 27 Drawing Sheets

U.S. PATENT DOCUMENTS

| | | | |
|---|---|---|---|
| 5,097,861 | 3/1992 | Hopkins | 137/78.3 |
| 5,173,855 | 12/1992 | Nielsen et al. | 364/420 |
| 5,208,855 | 5/1993 | Marian | 380/9 |
| 5,229,649 | 7/1993 | Nielsen et al. | 307/31 |
| 5,239,203 | 8/1993 | Thorngren | 307/116 |
| 5,246,164 | 9/1993 | McCann et al. | 239/11 |
| 5,262,936 | 11/1993 | Faris et al. | 364/140 |
| 5,265,005 | 11/1993 | Schmidt | 364/147 |
| 5,293,554 | 3/1994 | Nicholson | 364/420 |
| 5,333,785 | 8/1994 | Dodds et al. | 239/69 |
| 5,337,957 | 8/1994 | Olson | 239/63 |
| 5,444,611 | 8/1995 | Woytowitz et al. | 364/145 |
| 5,465,904 | 11/1995 | Vaello | 239/63 |
| 5,602,728 | 2/1997 | Madden et al. | 364/145 |

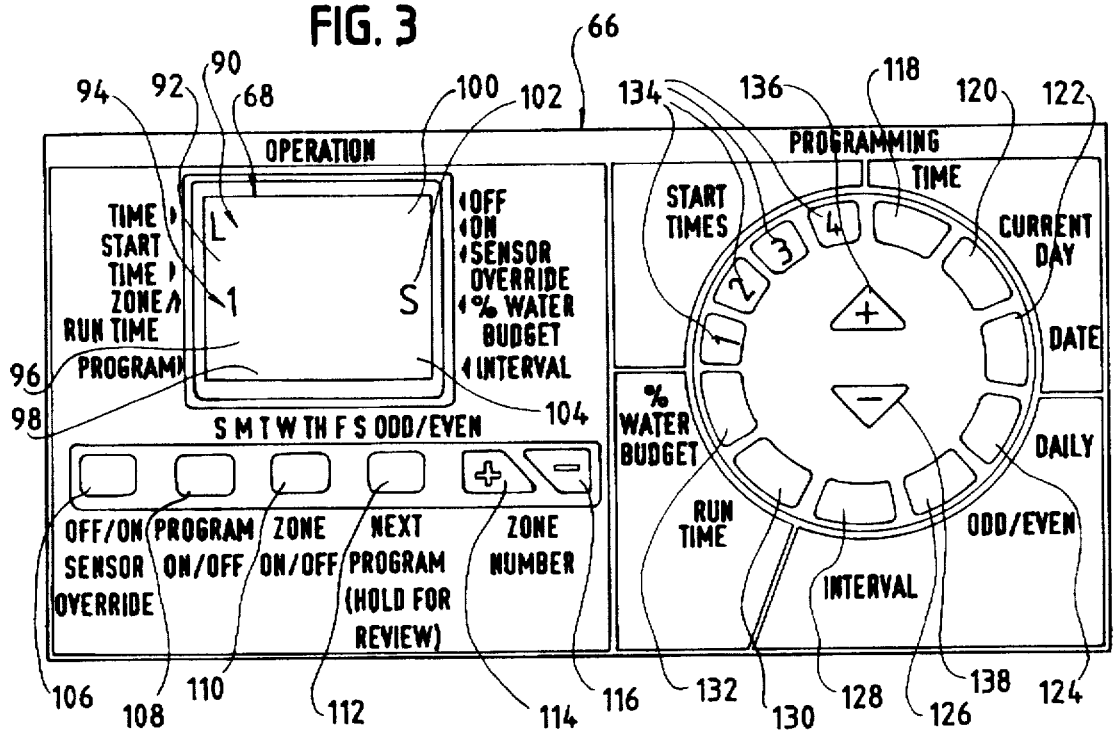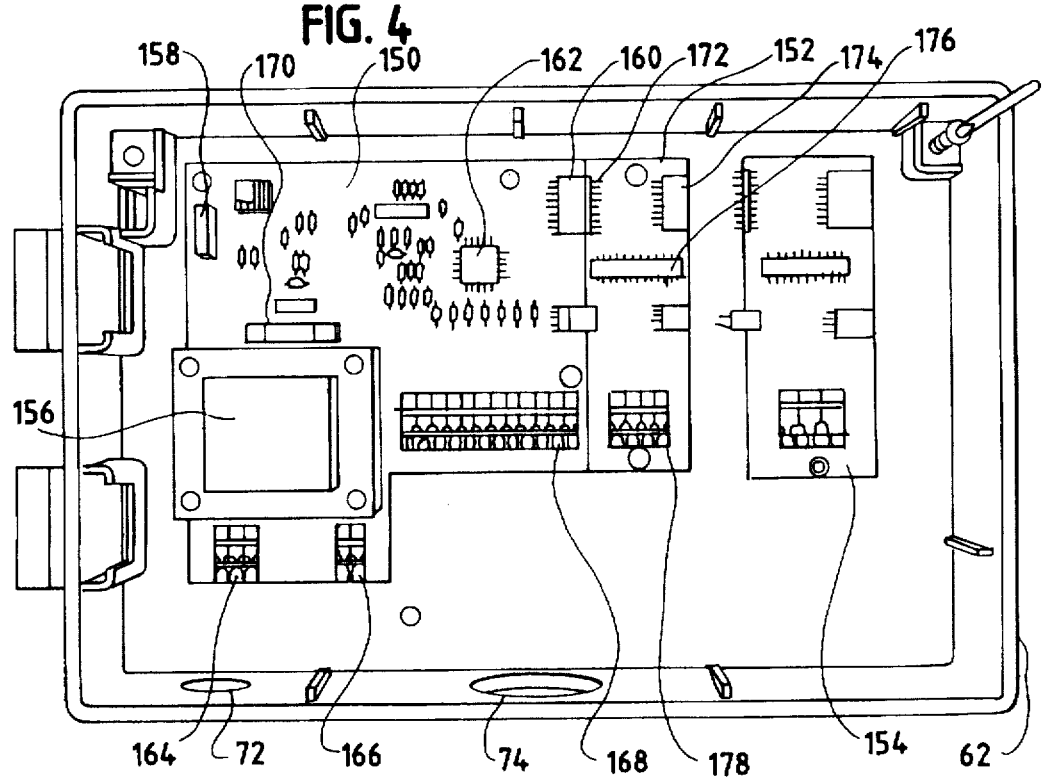

FIG. 6C

| COM0 | COM1 | COM2 | COM3 | COM4 | COM5 | COM6 | COM7 | COM0 | COM1 | COM2 | COM3 | COM4 | COM5 | COM6 | COM7 | |
|---|---|---|---|---|---|---|---|---|---|---|---|---|---|---|---|---|
| AN1 | AM1 | PM1 | AN2 | | | | | 8F | 8G | 8E | 8D | | | | | 66 |
| 4A | 4B | 4C | 4D | | | | | 8A | 8B | 8C | | | | | | 65 |
| 4F | 4G | 4E | | | | | | 9F | 9G | 9E | 9D | | | | | 64 |
| 3A | 3B | 3C | 3D | | | | | 9A | 9B | 9C | | | | | | 63 |
| 3F | 3G | 3E | | | | | | COM0 | | | | | | | | 62 |
| 2A | 2B | 2C | COL1 | | | | | AN3 | AM2 | PM2 | AN4 | | | | | 61 |
| 2F | 2G | 2E | 2D | | | | | COM1 | | | | | | | | 60 |
| 1A | 1B | 1C | | | | | | COM2 | | | | | | | | 59 |
| 1F | 1G | 1E | 1D | | | | | COM3 | | | | | | | | 58 |
| COM0 | | | | | | | | | | | 13F | 13G | 13E | 13D | | 57 |
| COM1 | | | | | | | | | | | 13A | 13B | 13C | | | 56 |
| COM2 | | | | | | | | | | | 14F | 14G | 14E | 14D | | 55 |
| COM3 | | | | | | | | | | | 14A | 14B | 14C | | | 54 |
| 7A | 7B | 7C | COL2 | | | | | | | | 15F | 15G | 15E | 15D | | 53 |
| 7F | 7G | 7E | 7D | | | | | | | | 15A | 15B | 15C | | | 52 |
| 6A | 6B | 6C | | | | | | | | | 16F | 16G | 16E | 16D | | 51 |
| 6F | 6G | 6E | 6D | | | | | | | | 16A | 16B | 16C | | | 50 |
| AN5 | | | | | | | | | | | 17F | 17G | 17E | 17D | | 49 |
| 5A | 5B | 5C | | | | | | | | | 17A | 17B | 17C | | | 48 |
| 5F | 5G | 5E | 5D | | | | | | | | 18F | 18G | 18E | 18D | | 47 |
| | | | | 12A | 12B | 12C | | | | | 18A | 18B | 18C | | | 46 |
| | | | | 12F | 12G | 12E | 12D | COM4 | | | | | | | | 45 |
| | | | | AN6 | | | | COM5 | | | | | | | | 44 |
| | | | | 11A | 11B | 11C | | COM6 | | | | | | | | 43 |
| | | | | 11F | 11G | 11E | 11D | COM7 | | | | | | | | 42 |
| | | | | 10A | 10B | 10C | | | 19G | 19E | 19D | | | | | 41 |
| | | | | 10F | 10G | 10E | 10D | 19A | 19B | 19C | | | | | | 40 |
| | | | | AN14 | AN22 | AN13 | M | 20F | 20G | 20E | 20D | | | | | 39 |
| | | | | AN23 | AN21 | AN12 | S | COM0 | | | | | | | | 38 |
| | | | | AN15 | AN20 | AN11 | C | 20A | 20B | 20C | | | | | | 37 |
| | | | | AN24 | AN19 | AN10 | B | COM1 | | | | | | | | 36 |
| | | | | AN16 | AN18 | AN9 | A | COM2 | | | | | | | | 35 |
| | | | | AN17 | | | | COM3 | | | | | | | | 34 |

238

FIG. 7C
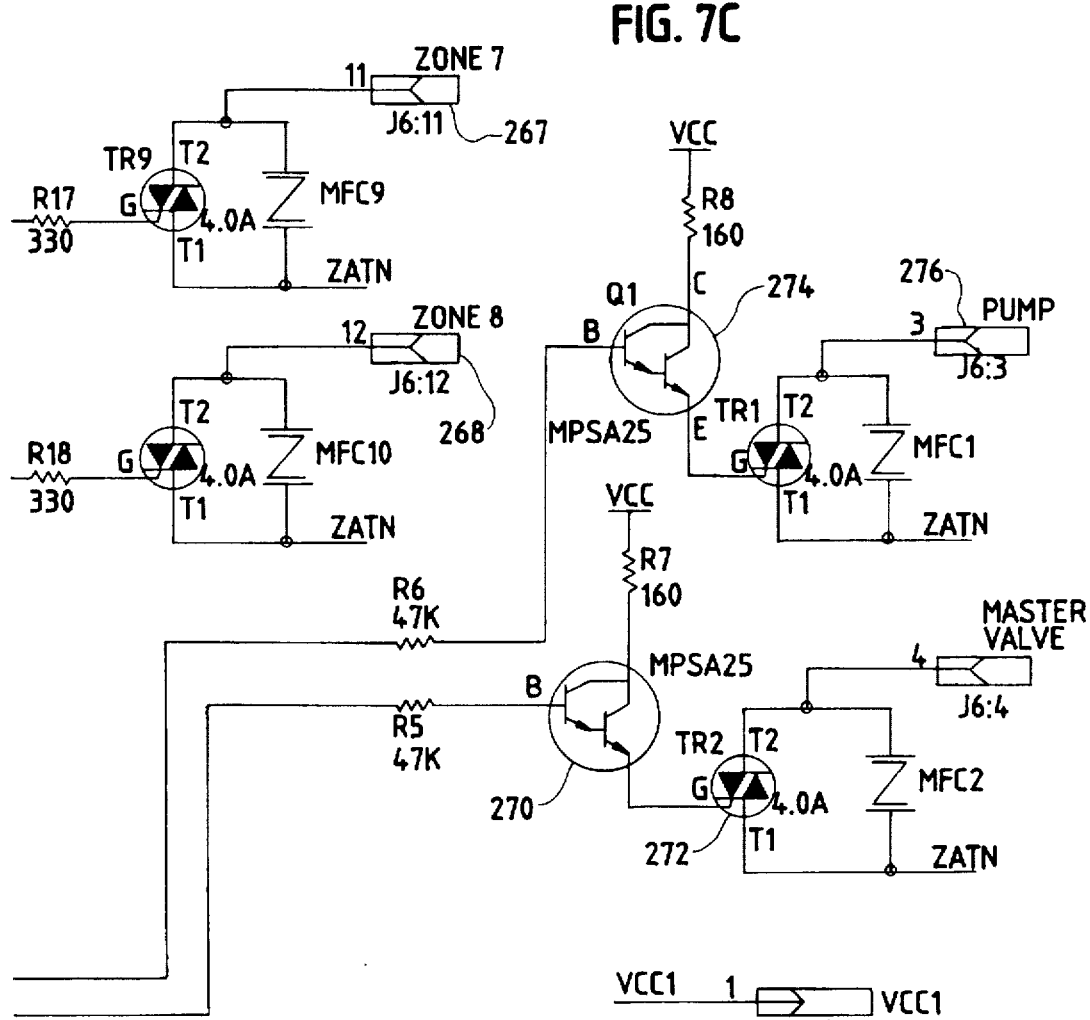
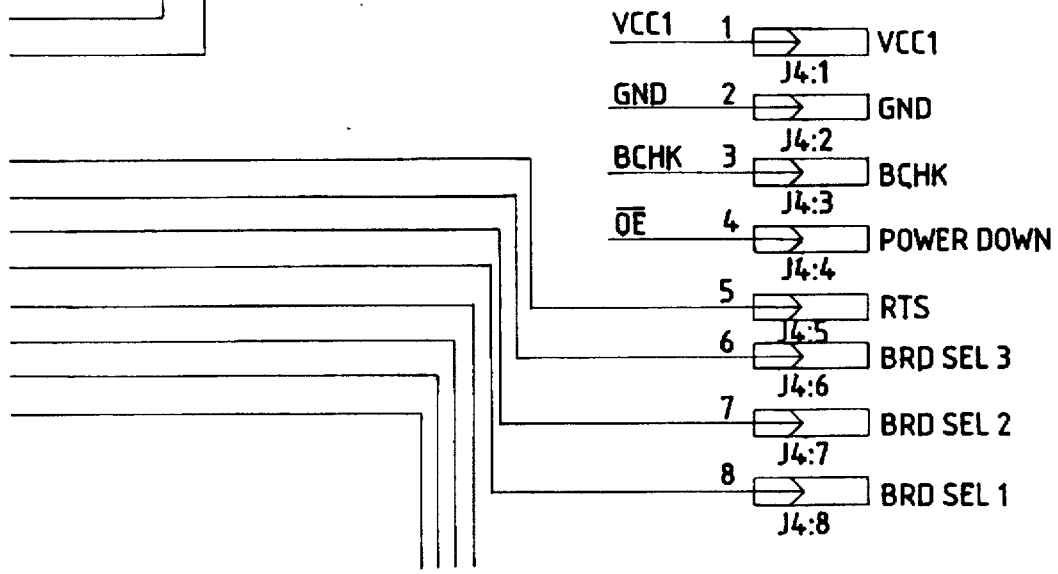

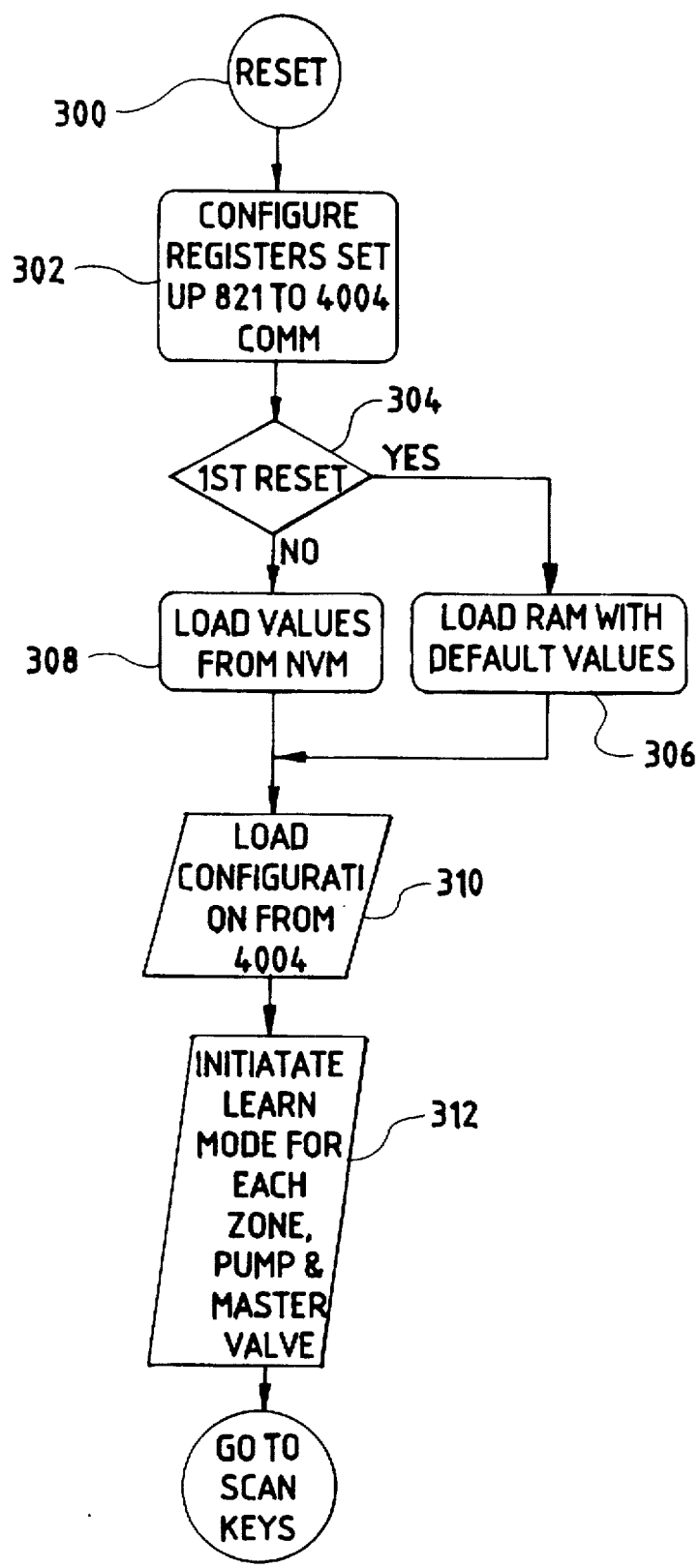

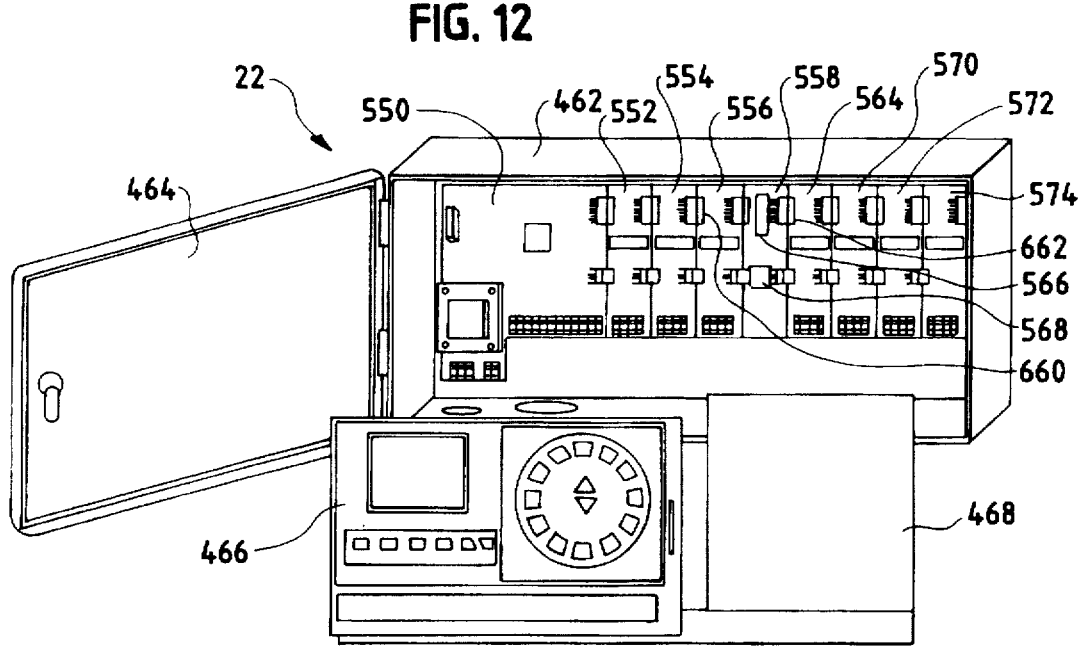

ADAPTABLE CONTROL SYSTEM FOR A VARIABLE NUMBER OF SWITCHES

FIELD OF INVENTION

The present invention relates to an adaptable controller for controlling the operation of electric devices. More specifically, the present invention is directed to an irrigation controller which adapts to control a variable number of sprinkler irrigation stations and accessories thereto.

BACKGROUND OF INVENTION

Controllers for electric switches connected to electrically-operated devices in remote locations are useful for numerous applications. For example, one application is the control of irrigation systems for irrigating lawns. Such irrigation systems typically include a controller which retains a desired sequence of irrigation operating instructions entered by a user. The valves are connected to electrical switches which the controller activates. The controller therefore controls one or more remote valves via the switches so as to allow water to be supplied to sprinklers that are located in desired areas or zones. The controller will issue commands to turn on or turn off valves at designated times ensuring that various zones are irrigated according to the user instructions.

Conventional irrigation controllers are specifically designed for a particular application. Those irrigation systems thus have a controller designed specifically to control the fixed number of sprinklers in that particular irrigation system. However, there is often a need to expand the number of sprinklers on a system as a user desires to irrigate additional areas of a property or add different flora and fauna to an existing plot. Not only must the controller be specifically altered to accommodate those additional stations but often it is required to provide additional power management in order to properly power the additional switches. It may also be desirable to monitor the switches to ensure proper operation.

Additionally, it may be desired for the controller to operate in accordance with environmental conditions detected through a sensor so as to prevent over watering or saturation of a particular zone.

It is also a desirable marketing feature to allow distributors to maintain a limited number of SKUs (Stock Keeping Units) that will service the largest percentage of customers.

Accordingly there is a need for a controller that may be adaptable to accommodate different numbers of control switches and expandable to allow different configurations.

SUMMARY OF THE INVENTION

The above needs are met by an adaptable controller in accordance with the present invention. The present invention includes a control system and a method for controlling a variable number of zones of electrically-operated devices. Each zone includes at least one electrically-operated device. The control system has a processor unit which includes a memory for storing a user-defined program relating to selection and operation of the zones of electrically-operated devices. The processor unit generates command data in accordance with the user-defined program for the selection and operation of the zones of electrically-operated devices.

A set of switches are provided in communication with the processor unit. Each switch is capable of being connected to at least one electrically-operated device of a corresponding zone. In this manner, the connected electrically-operated device is operated upon actuation of the switch.

The processor unit ascertains the total number of switches in communication with it and limits the variable number of zones selected and controlled by the user-defined program to the ascertained total number of switches.

Preferably, an interface is also provided to receive the command data from the processor unit and identify the switch connected to the electrically-operated device of the zone selected by the user-defined program. The interface sends an actuation signal to actuate the identified switch for operation of the electrically-operated device of the selected zone.

An add-on unit having at least one switch may be added to the controller. The switch on the add-on unit is likewise capable of having at least one electrically-operated device of an additional zone connected to it. The switch operates the connected electrically-operated device upon actuation of the switch. The add-on unit also has a program array logic device for receiving the actuation signal from the interface. The program array logic device identifies the switch connected to the electrically-operated device of the zone selected by the user-defined program and translates the actuation signal to the identified switch to operate the electrically-operated device of the selected zone.

A specific application of the invention is an irrigation system for irrigating a variable number of zones. The irrigation system has a plurality of electrically-operated valves for regulating the supply of water. Each zone includes at least one electrically-operated valve. The control system controls the electrically-operated valves according to a user-defined program to irrigate the zones.

Numerous other aspects and advantages of the present invention will become apparent from the following drawings and detailed description of the invention and its preferred embodiments.

BRIEF DESCRIPTION OF THE DRAWINGS

The present invention may be better understood with reference to the detailed description in conjunction with the following figures where like numerals denote identical elements, and in which:

FIG. 3 is a front view of the control panel of the adaptable controller box according to the present invention;

FIG. 4 is a top-down view of the adaptable controller box with the front panel removed;

FIG. 9 is a flow diagram of the reset sequence for the controller according to the present invention;

FIG. 12 is an exploded view of an alternate representative embodiment of the controller according to the present invention.

DETAILED DESCRIPTION OF THE PREFERRED EMBODIMENT

Figure 1:
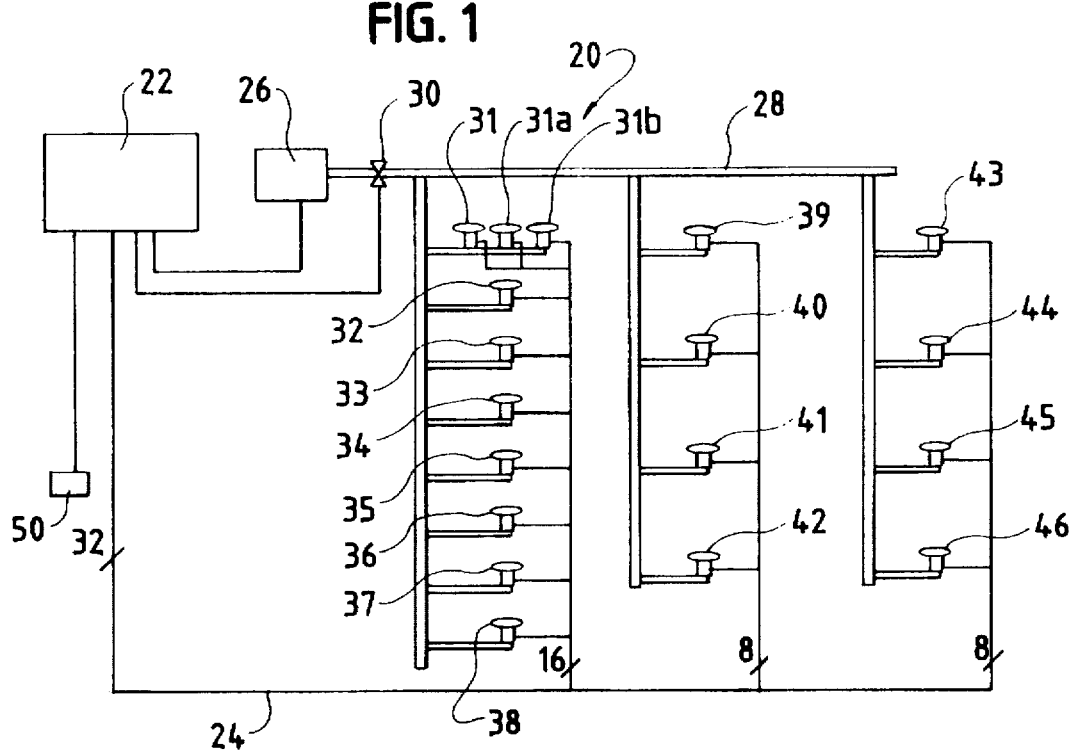
FIG. 1 is a block diagram of an irrigation system according to the present invention.

The description of the components of this embodiment of the present invention will be explained first, followed by a description of the operation of the embodiment. One representative embodiment of the present invention is shown in FIG. 1, which is a block diagram of an irrigation system 20. The irrigation system 20 has a controller 22, which is connected to a control line network 24 and an optional pump 26. A pipe network 28 is connected to the pump 26 and water flow may be controlled through an optional master valve 30, which, in turn is controlled by the controller 22. The master valve 30 may control flow from another water source if the pump 26 is not present.

The pipe network 28 supplies water to sprinklers 31–38, sprinklers 39–42, and sprinklers 43–46. The sprinklers are standard models such as pop up rotary spray heads, misters, impact spray heads, etc. Each of these sprinklers (31–46) are physically located on a plot to irrigate a predetermined area or zone. Thus, the configuration shown in FIG. 1 has 16 zones. Each zone has an assigned electric switch in the controller 22 to which the sprinkler in that zone is connected. The switches may be connected to any electrically-operated devices such as the sprinklers 31–46 by the control line network 24. The sprinklers 31–46 include solenoid valves (not shown) which are opened via electric current sent through the control line network 24 from the controller 22.

Each zone may have more than one valve or sprinkler connected to its switch. For example, sprinklers 31a and 31b are controlled by the same switch as sprinkler 31. When a particular valve or valves in a zone are selected and opened by the controller 22, water flows through the pipe network 28 and out the corresponding sprinkler, thus irrigating the selected zone. As will be explained below, different numbers of zones may be operated by controller 22. For purposes of explanation and not limitation, the present configuration includes eight zones (sprinklers 31, 31a, 31b, 32–38) controlled by the basic controller 22, while two groups of four zones (sprinklers 39–42, 43–46) are attached to two add-on boards respectively. Preferably, a moisture humidity sensor 50 also is coupled to the controller 22 in order to sense environmental conditions.

It should be noted that any electrically-operated device that meets the power limitations of the controller 22 may be substituted for some or all of the sprinklers 31–46. For example, these devices may include lights, motion detectors, audio speakers, surveillance cameras, or the like. Of course, additional power may be supplied to the electrically-operated devices if power limitations are exceeded. It is also to be understood that each sprinkler 31–46 may represent multiple electrically-operated devices such as sprinklers 31a and 31b as long as the total power requirements of the devices do not exceed the capacity of the controller.

Figure 2:
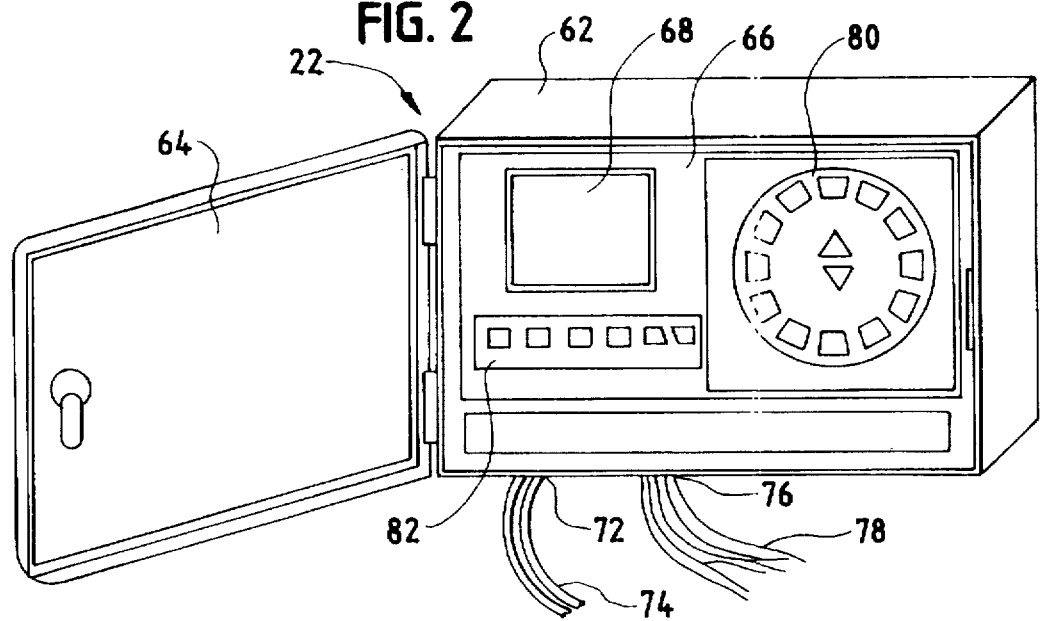
FIG. 2 is a perspective view of a representative embodiment of the adaptable controller box according to the present invention.

FIG. 2 shows a perspective view of the controller 22. The controller 22 has an environmentally protected box 62. The box 62 is mountable in a central and accessible location such as a garden shed. The box 62 has cut-outs (not shown) for receipt of mounting devices, such as brackets.

The box 62 has a hinged cover door 64, which allows a user access to a control panel 66. In the preferred embodiment, the box 62 and door 64 are constructed of Cyclolac KJB plastic but may be constructed of any other sturdy water-proof material such as rolled steel. A gasket (not shown) is provided on the inside perimeter of the cover door 64 to assist in creating a water tight barrier when the cover door 64 is closed.

The control panel 66, which is removable from box 62, allows a user to enter irrigation programs at a remote location as will be described below. The box 62 also includes an outlet 72 for power supply cables 74 and an outlet 76 for control cables 78 leading out to the various electrically-operated devices of the system such as the corresponding valves in the sprinklers 31–46. The power cables 74 may be connected to any power source such as a common 115 volt or 220 volt AC source. The control panel 66 has a screen 68 which displays system status and user-defined program information. The user may input data for user defined programs relating to selection and operation of electrically-operated devices controlled by controller 22 via a programming keypad 80 mounted on the control panel 66. The user may also operate electrically-operated devices such as the sprinklers 31–46 independent of the programs by an operation function keypad 82.

FIG. 3 is a front view of the control panel 66. The screen 68 preferably is a liquid crystal display (LCD) which has designated blocks for system information and user programs. In this manner, all operating variables of the user-defined program may be displayed on a single screen. However, the screen 68 may be of other conventional types such as a cathode ray tube, flat panel display, light emitting diodes, or the like. The screen 68 may conveniently be segmented into display blocks, which include a time block 90, a start time block 92, a zone/run time block 94, a program block 96, a schedule block 98, a sensor override block 100, a water budget block 102 and an interval block 104.

The operation function keypad 82 has an on/off sensor override key 106, a program on/off key 108, a zone on/off key 110, a next program key 112, and increase zone number key 114 and a decrease zone number key 116. The keys on the programming keypad 80 may be arranged in any convenient fashion such as the circular representation shown on the control panel 66 of FIG. 3. These keys include control keys, such as a time key 118, a current day key 120, a date key 122, a daily key 124, an odd/even key 126, an interval key 128, a run time key 130, a water budget key 132, and start time keys 134. The various programs and variable data may be displayed on the screen 68 and may be changed via control keys 136 and 138. The function of the programming and operation keys with regard to programming and manual control will be explained below.

FIG. 4 shows an exploded top-down view of the box 62 with the front panel 66 removed. A printed circuit board motherboard 150 is mounted on the back panel of the box 62. Add-on units such as a first add-on board 152 and identical second and subsequent add-on board 154 may be mounted on the back panel of box 62. A data bus (not pictured) connects the motherboard 150, and the add-on boards 152 and 154. Although only two add-on boards are shown, additional add-on units may be added, as will be explained below. The motherboard 150 has a transformer 156 which provides the correct AC voltage to power the electrically-operated devices coupled to the electrical switches as well as the current AC voltage to drive the power supply which provides DC power to the electronic components in the system. The electronic components on the motherboard 150 are connected via a connector 158 to the data bus of the front panel 66 and by a connector 160 to the add-on board 152. Control and data signals sent from front panel 66 and add-on boards 152 and 154 via connectors 158 and 160 are directed toward an interface chip 162. In the preferred embodiment, the interface chip 162 is a Samsung 57C4004 model application specific integrated circuit (ASIC).

As also shown in FIG. 4, the transformer 156 is connected to a three-line AC power source through a connector 164. A connector 166 is installed for the sensor 50. A battery 170 is mounted on motherboard 150 for power backup.

In the representative embodiment shown in FIG. 3, up to eight electrically-operated devices may be operated by the motherboard 150 via switches coupled to connectors 168. For example, in the irrigation system 20 of FIGS. 1–4, connectors 168 supply current from the switches to drive solenoid valves on the sprinklers 31–38.

It is to be understood that add-on board 152 is identical to add-on board 154 (and subsequent add-on boards, if present) and thus the components on both are identical. The add-on board 152 has a connector 172 which is matable with connector 160 of the motherboard 150. A second connector 174 may be used to connect the second add-on board 154 to the add-on board 152. Thus, multiple add-on boards may be connected in daisy chain fashion. The signals received by the add-on board 152 are processed by a programmable array logic (PAL) chip 176 which interprets commands from the interface chip 162. In the configuration shown in FIG. 4, the add-on board 152 controls up to four electrically-operated devices via switches coupled to connectors 178. In the irrigation system 20 of FIGS. 1–4, the connectors 178 on the first add-on board 152 drive sprinklers 39–42 while the connectors on the second add-on board 154 drive sprinklers 43–46.

The logic and electronic components of the system according to the preferred embodiment of the present invention mounted on three circuit boards; a panel circuit board, the motherboard 150, and add-on boards. The panel circuit board (not pictured in FIGS. 1–4) is mounted on the back of the control panel 66. The motherboard 150 is mounted on the back panel of the box 62 as are any add-on boards on the system.

For purposes of illustration, and not limitation, the box 62 of the representative embodiment depicted in FIGS. 1–4 has the physical capacity to mount three add-on boards. Larger boxes allow the addition of more add-on boards. The controller 22 of the preferred embodiment is designed to control up to seven add-on boards with each of the add-on boards driving electrically-operated devices in four zones and the motherboard driving electrically-operated devices in eight zones, giving an overall control of 36 zones. However, as will be explained below, the number of zones which may be controlled is theoretically unlimited and the preferred embodiment control of 36 zones is preferred as a matter of convenience and economics only.

Figure 5:
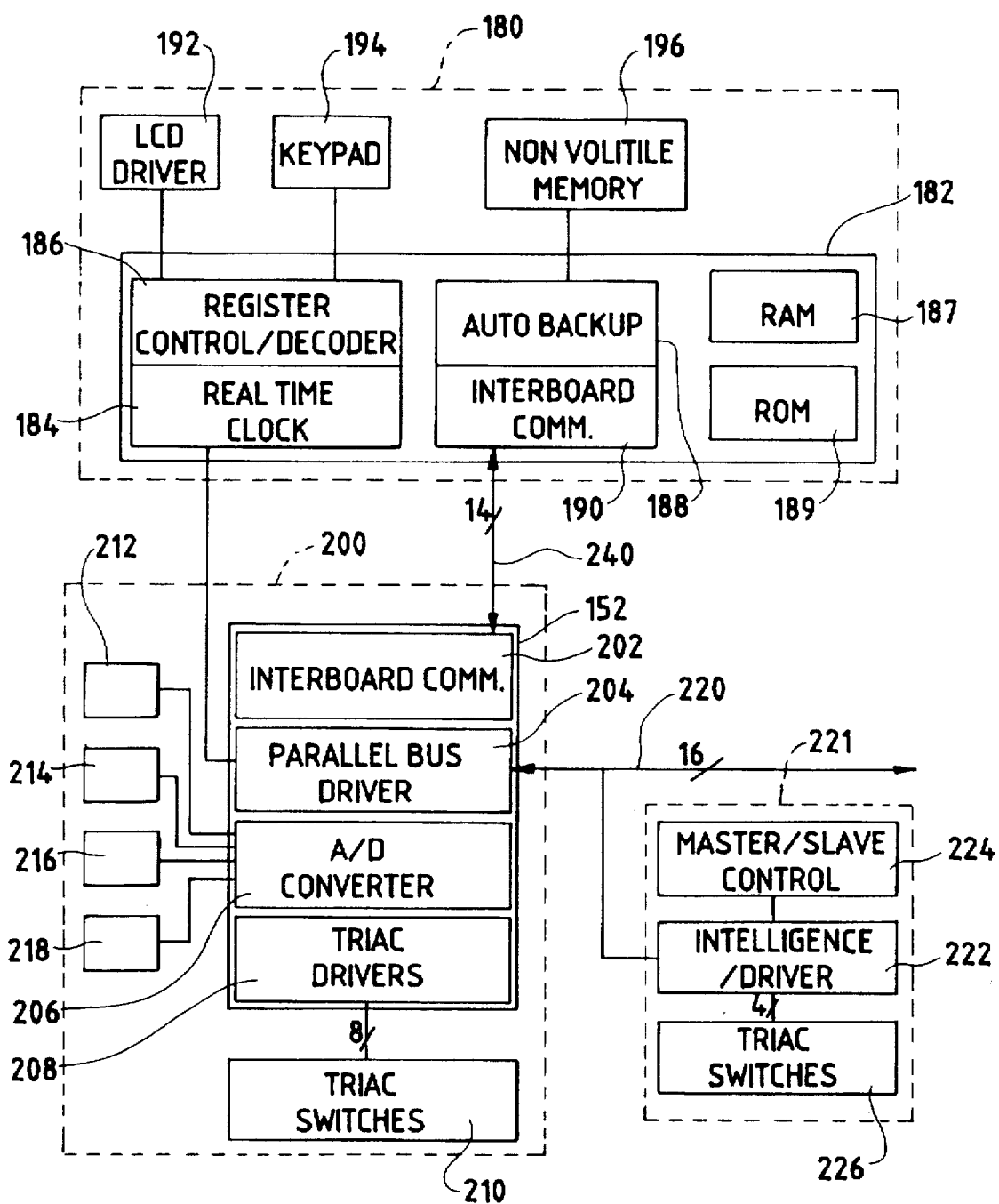
FIG. 5 is a block diagram of the components of the controller according to the present invention.
Figure 6:
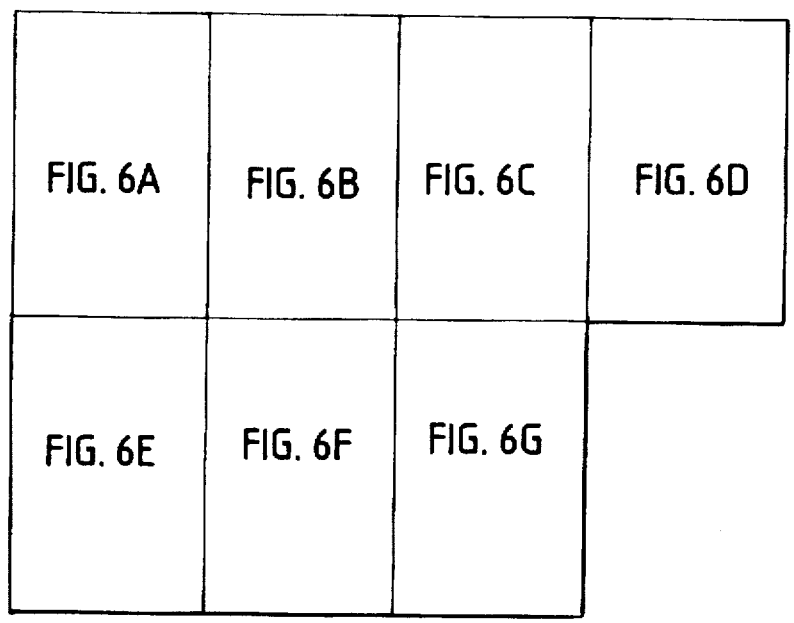
FIGS. 6A–6G are a circuit diagram of the front panel circuit board according to the present invention.
Figure 6A:
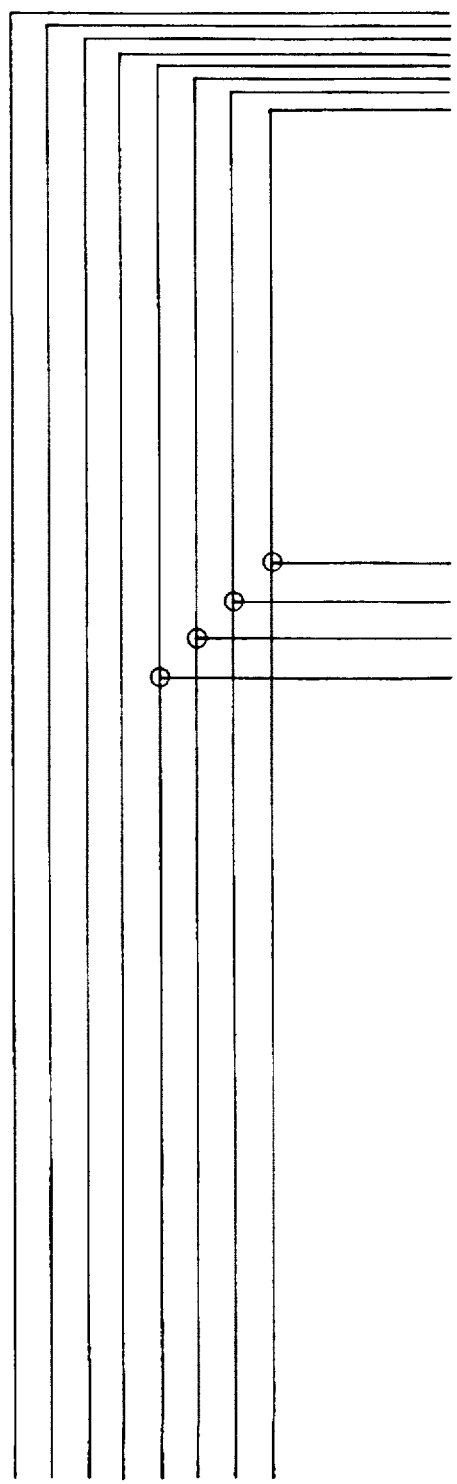
Figure 6B:
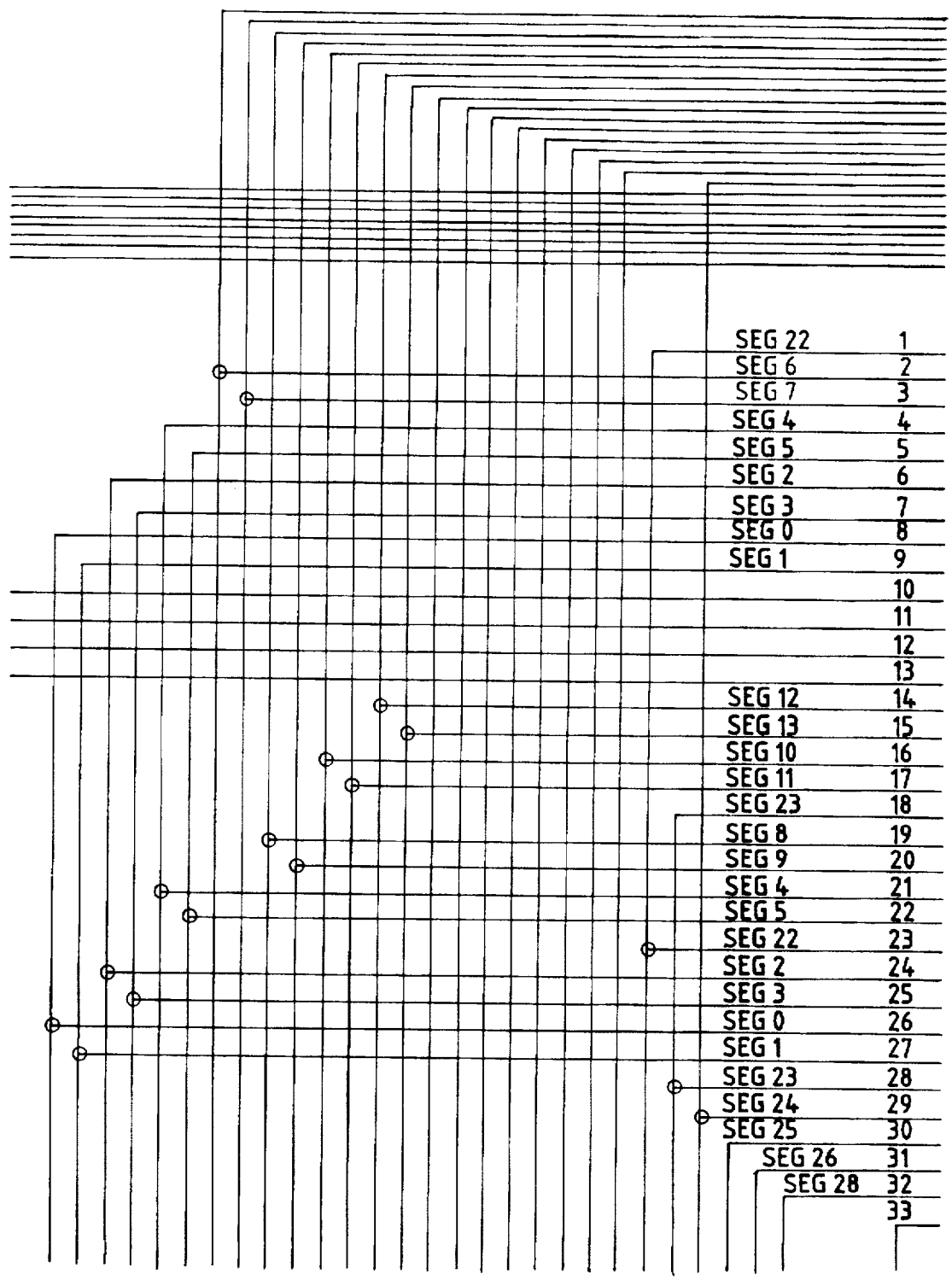
Figure 6D:
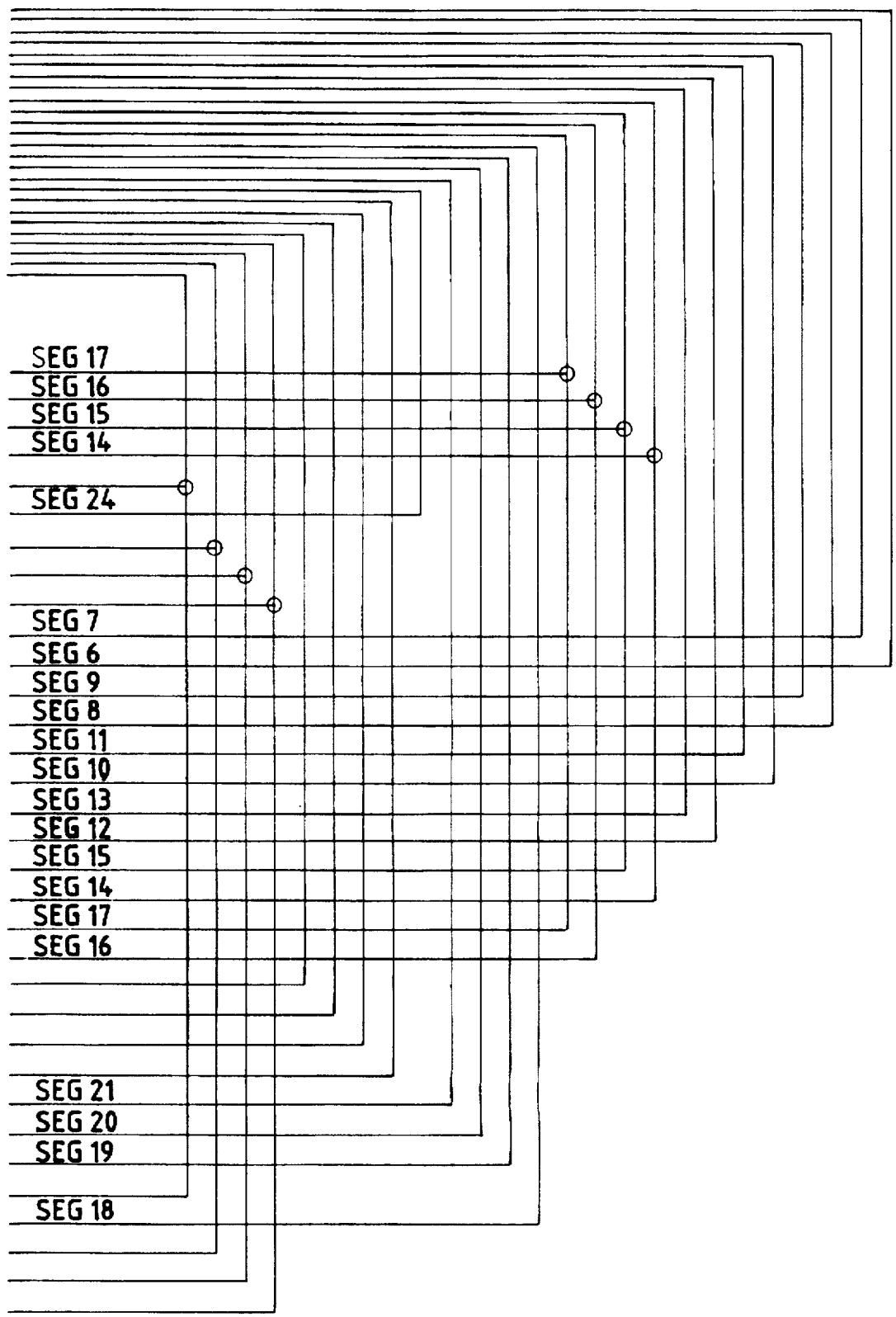
Figure 6E:
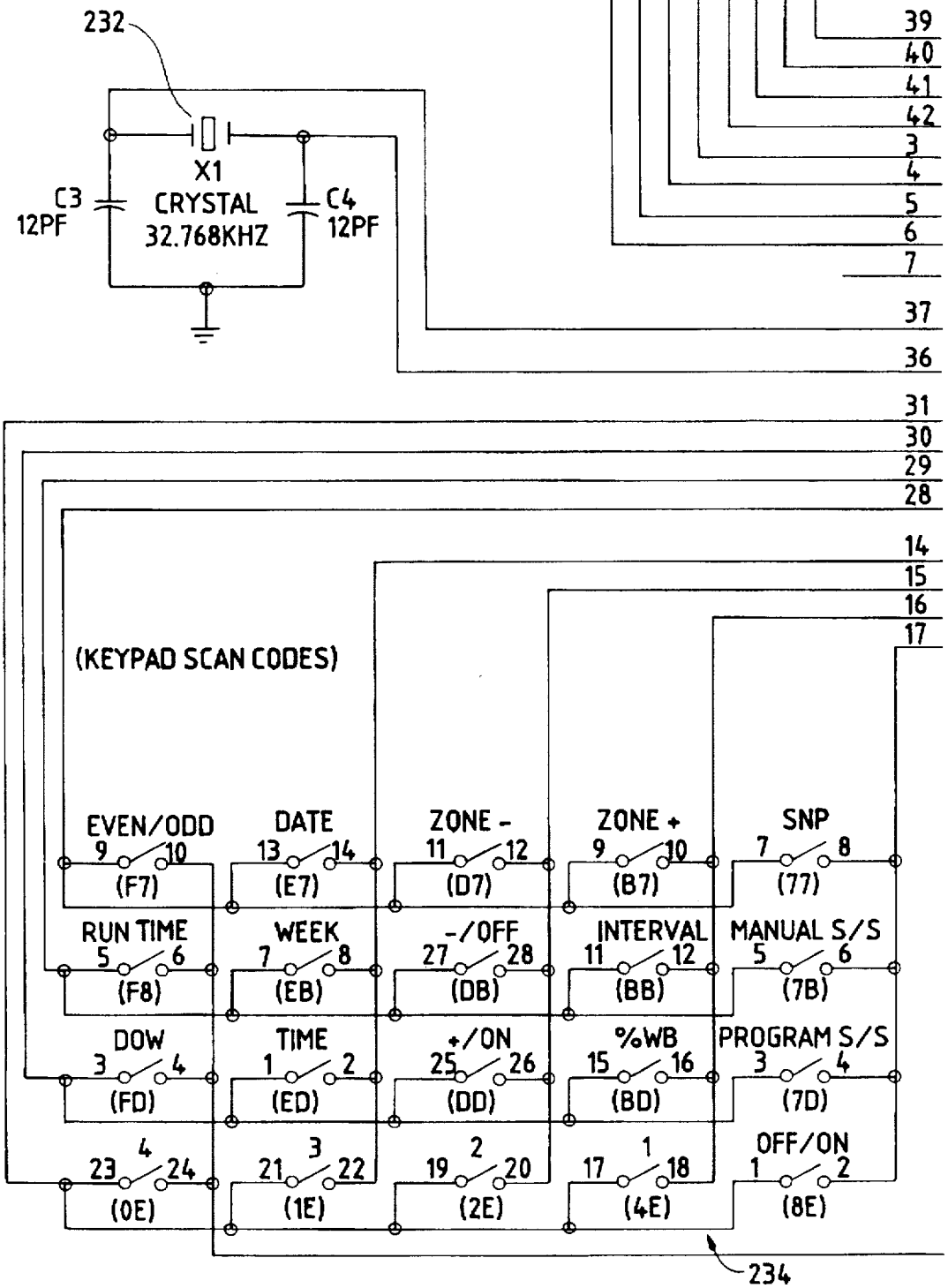
Figure 6F:
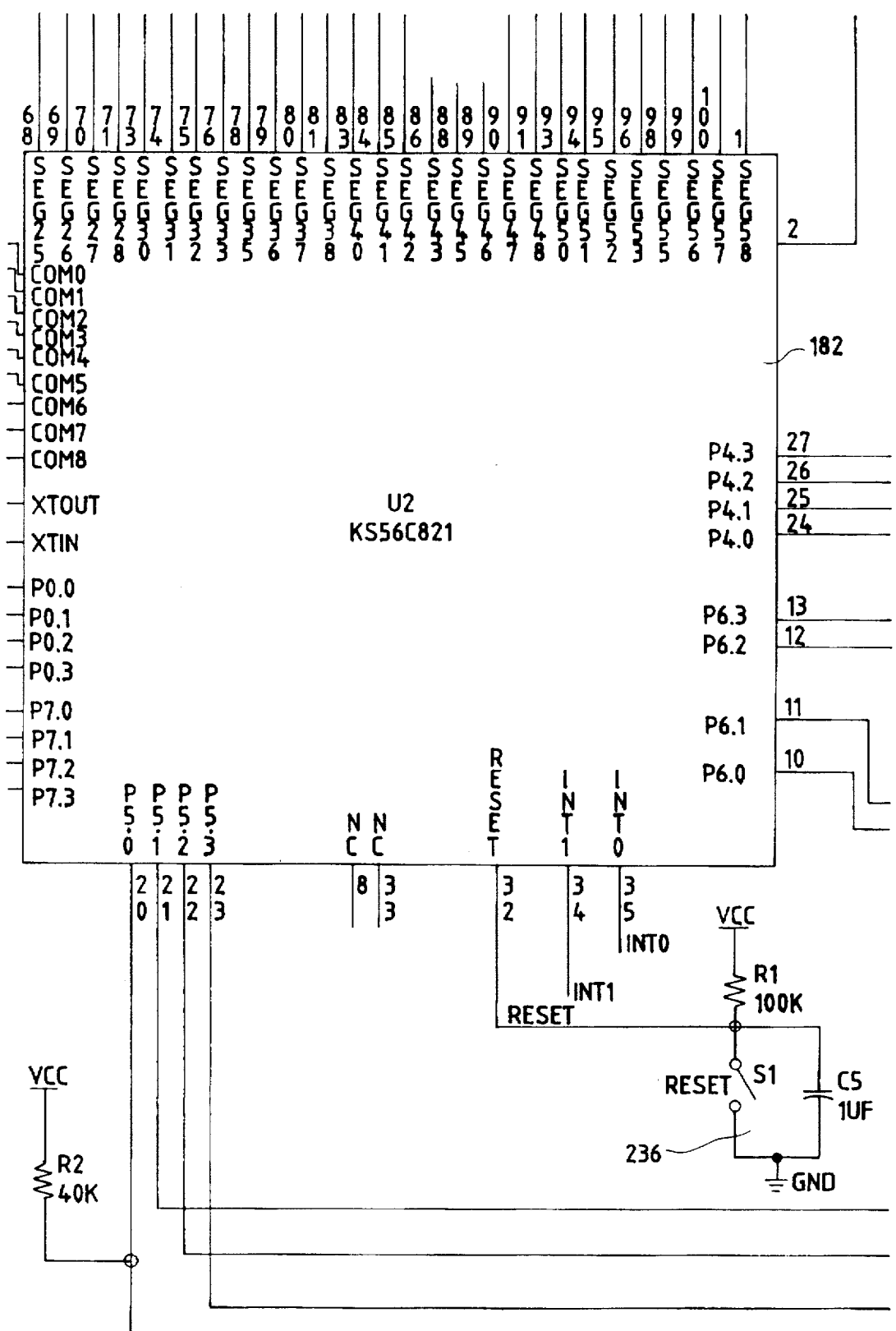
Figure 6G:
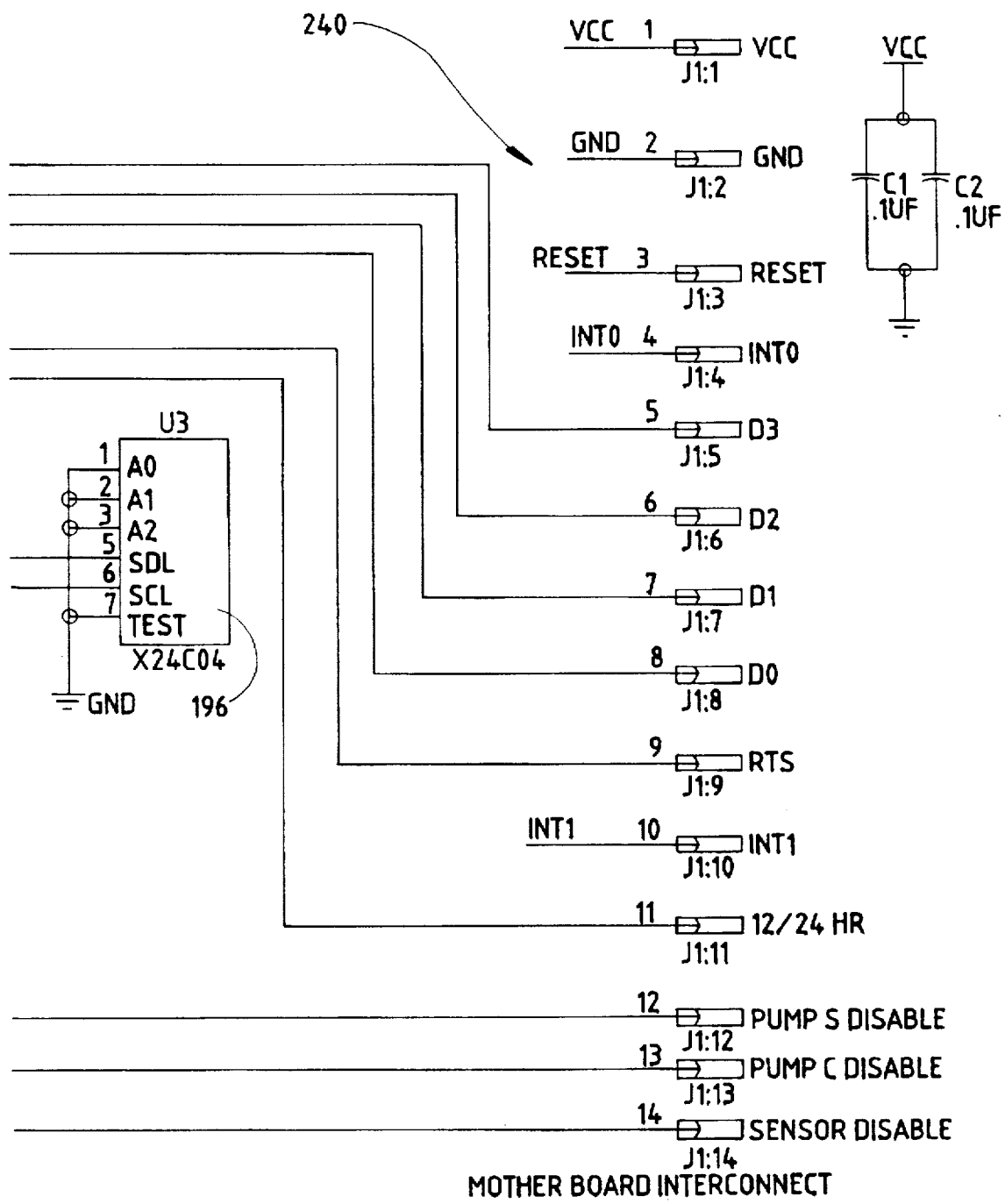

A block diagram of the electronic components on the three circuit boards is shown in FIG. 5. A panel circuit board block 180 represents the panel circuit board mounted on the back of the control panel 66. The panel board 180 includes a processor unit such as a microprocessor 182. In the preferred embodiment, the microprocessor 182 is a KS56C821 model Samsung ASIC chip, although any suitable processor having the capabilities described below may be used. The microprocessor 182 includes a clock 184, a register control coder/decoder 186, an auto backup program 188, and an interboard communications block 190. The microprocessor 182 also has access to an on-board random access memory (RAM) 187. System programs are burned into a read only memory (ROM) 189. In the preferred embodiment, the RAM is 5 kilobytes, while the ROM is 8 kilobytes. A separate block of RAM (3 kilobytes) is dedicated to driving screen 68. Different amounts of RAM and ROM may be used if greater speed or memory capability is desired.

The microprocessor 182 is also connected to a LCD driver 192 which interfaces with the screen 68 and a keypad interface 194 which interface with the screen 68 and the keypads 80 and 82, respectively. A non-volatile memory 196 is located on a separate chip for the purposes of backing up user-defined programs and program parameters. The non-volatile memory 196 is connected to the auto backup block 188. The non-volatile memory 196 in the preferred embodiment is a Xicor X24C04 chip having a storage capacity of 4 kilobytes, although other alternate memory devices such as floppy disks, tapes, flash memory, hard drives, etc., of different capacities may be used for memory 196 if appropriate interface electronic modifications are made. The panel circuit board block 180 is connected to the motherboard 150 via a 14 line bus 240. The bus 240 includes interboard communications and a clock and timing line as will be described below.

A motherboard block 200 represents the motherboard 150 and includes the interface chip 162. As shown in FIG. 5, the interface chip 162 includes an interboard communication block 202, a parallel bus driver 204, analog-to-digital converters 206, and a switch drivers block 208. The switch drivers block 208 includes drivers for a valve TRIACs block 210. A battery voltage sensor 212 is connected to the analog-to-digital converters 206. Additionally, an AC power sensor 214 is also connected to the analog-to-digital converters 206 as well as a power management sensor 216 and the sensor control 218. The sensor control 218 is in turn connected to the sensor 50. The sensors 212, 214, 216 and 50 all generate analog voltage signals that are converted to digital signals and sent to the microprocessor 182 for further processing. The parallel bus driver 204 drives a 16-line bus 220 which is connected to the add-on board 152.

An add-on block 221 represents an add-on unit such as the add-on board 152. The PAL 176 has a driver block 222 which is coupled to a master slave control 224. The drivers in the driver block 222 are connected to a switches block 226 which correspond to the electrically-operated devices connected to the add-on board 152. The master/slave control 224 allows external signals to be transmitted from the add-on board 152 to the interface chip 162. Additionally, the bus 220 allows the add-on board 152 to be connected to additional add-on boards.

The following explanation relating to specific circuit components is made with reference to the blocks in FIG. 5. The circuit diagram for the preferred panel circuit board is shown in FIGS. 6A–6G. The microprocessor 182 on the panel circuit board is connected to crystal clock 232 which runs at 32.678 KHz. Other types of clock circuits may be used which run at different speeds depending on the application to which the system 20 is to be applied. The microprocessor accepts inputs from the programming and operation keys via a five column and four row strobe switch network 234. The learn function and power management function, as will be described below, are activated by a reset circuit 236. The outputs from the LCD driver 192 in the microprocessor 182 are connected to LCD driver lines 238. Communication to the motherboard 150 from the panel circuit board is maintained through a fourteen line bus 240.

The 14-line bus 240 consists of two power lines (VCC and GND), which supply the electronic components on the panel board with a 5 volt power supply (VCC). The reset line (RESET) is used to transmit a signal to reset the system as will be explained below. Command data regarding the selection and operation of the TRIACs connected to the electrically-operated devices in the irrigation zones are sent through four data lines (D0–D3). An interrupt line (INT1) is provided for signals from the interface chip 162 to indicate sending data and acknowledgement of sent data. The request to send line (RTS) is used to send signals to the interface chip 162 to indicate that command data will be sent from the microprocessor 182 through the data lines D0–D3. The clock system may be switched between military and standard time via a signal sent from the motherboard 150 via the 12/24 HR line.

A circuit diagram of the motherboard 150 is shown in FIGS. 7A–7F. The motherboard 150 communicates with the panel board via the fourteen line bus 240. A switch 242 changes the system time from military to standard time. A switch 244 disables the pump 26, if connected, for the C user program (described below), and a switch 246 disables the pump 26, if connected for the S user program. A switch 248 alters the run time designation of the system, changing hours to minutes, and minutes to seconds. In the preferred embodiment, the switches 242, 244, 246, and 248 are a bank of toggle switches which may be flipped manually and are mounted on the motherboard 150. The transformer 156 is connected to a three wire AC input. An AC power detection circuit 250 has a panel voltage regulator 254 (VCC) and a motherboard voltage regulator 256 (VCC1). The output of the transformer 156 is connected to an analog-to-digital converter of the interface chip 162. In this manner, a power management circuit 252 compares the current output across resistor 258 in order to determine the load on each of the devices controlled by the system as will be explained further below. The interface chip 162 has a number of internal drivers (switch drivers block 208) which are connected to and actuate switches such as the eight TRIACs 261–268 which in turn may be connected to electrically-operated devices, such as a solenoid valve or valves of a sprinkler or sprinklers. Different power switch devices such as high voltage transistors or transistors in conjunction with amplifier circuits may be used for TRIACs 261–268 if desired. The interface chip 162 also sends a control signal to a transistor 270 which amplifies the signal to actuate a TRIAC 272 which operates the master valve 30. Similarly, the interface chip 162 sends a control signal to a transistor 274 which amplifies the signal to actuate a TRIAC 276 which operates the pump 26.

A reference voltage circuit 278 provided on the motherboard 150 uses a comparator, an amplifier and a zener diode to maintain a constant reference voltage for the analog to digital converters 206 on interface chip 162. A lightning protection circuit 280 is provided to shield the components on motherboard 150 from power surges.

Backup power is provided by the battery 170. In this manner, the battery 170 prevents the microprocessor 182 from crashing or resetting if the AC power source to transformer 156 is shut off. The battery 170 is connected to an analog-to-digital converter of interface chip 162.

Actuation data and the output signals from the interface chip 162 are sent to the add-on units such as add-on board 152 via a sixteen line parallel bus 220. Two lines (VCC1, GND) of the bus 220 are dedicated to power. A pulse check line (BCHK) is provided for sending acknowledgment signals from the add-on boards to the interface chip 162 to indicate that a proper connection exists. A power down line is provided for signaling that power from transformer 156 has been cut-off. This signal puts the TRIACs on the add-on boards in a neutral state so no current is drawn from motherboard 150. The interface chip 162 indicates that data will be transmitted by sending signals down a request to send (RTS) line. Three last board selected lines (LST_SEL1–3) are used during the learn mode (described below) to ascertain the number of attached add-on boards as well as to determine their location in relation to the interface chip 162 and each other. Each add-on board may be addressed via three address lines (BRD_SEL1–3). Data for actuating selected switches is transmitted through four lines (D0–D3). Finally, an EXT_INT line is provided for external interrupt signals from the add-on boards.

Figure 8:
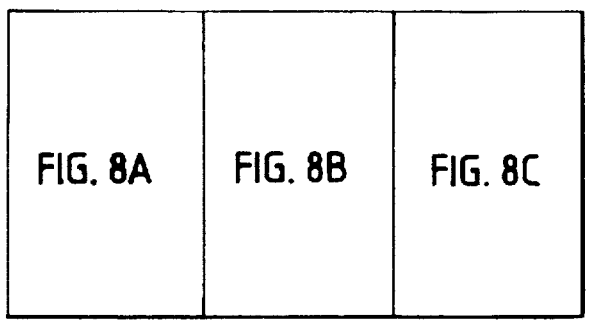
FIGS. 8A–8C are a circuit diagram of an add-on unit board according to the present invention.
Figure 8A:
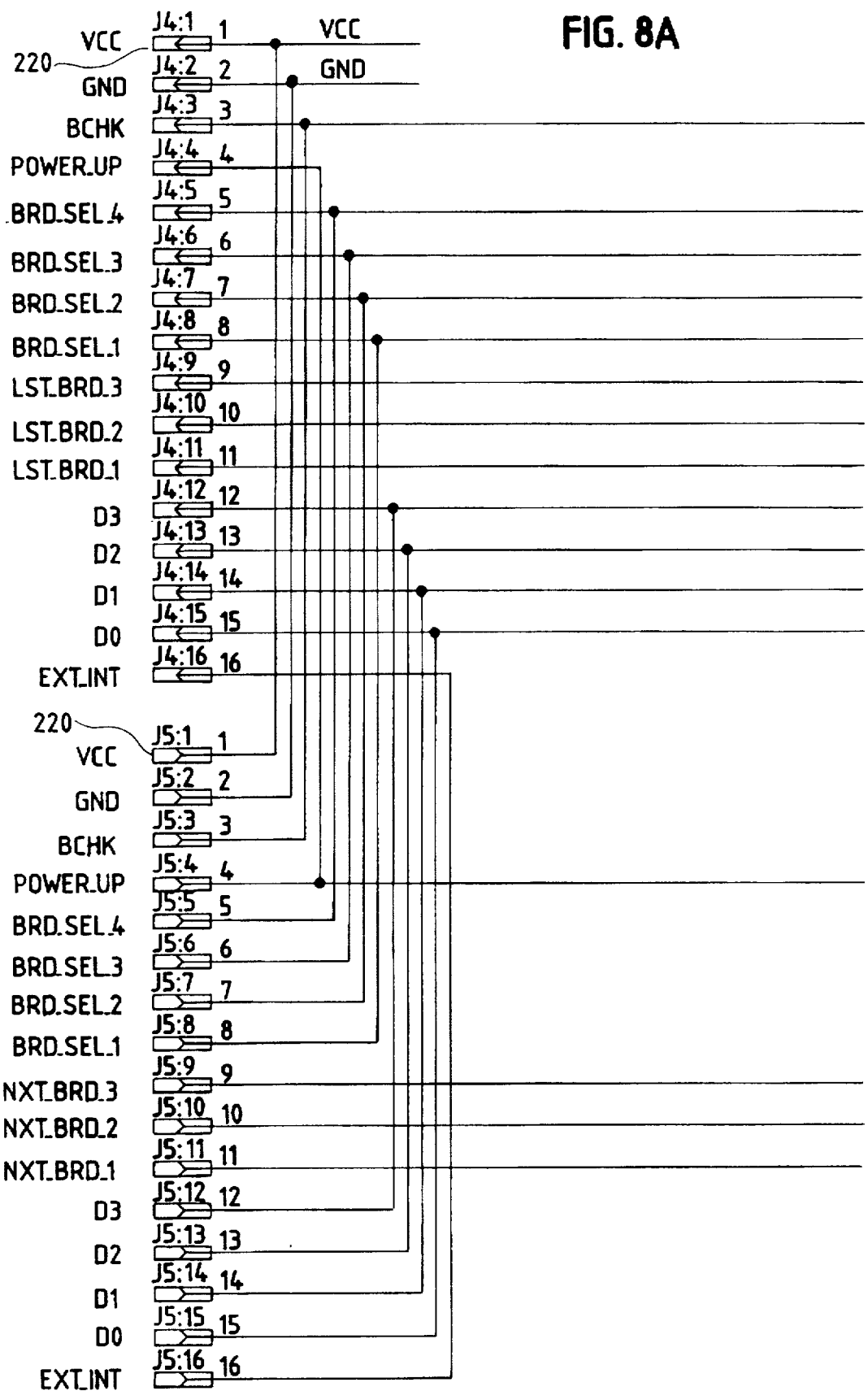
Figure 8B:
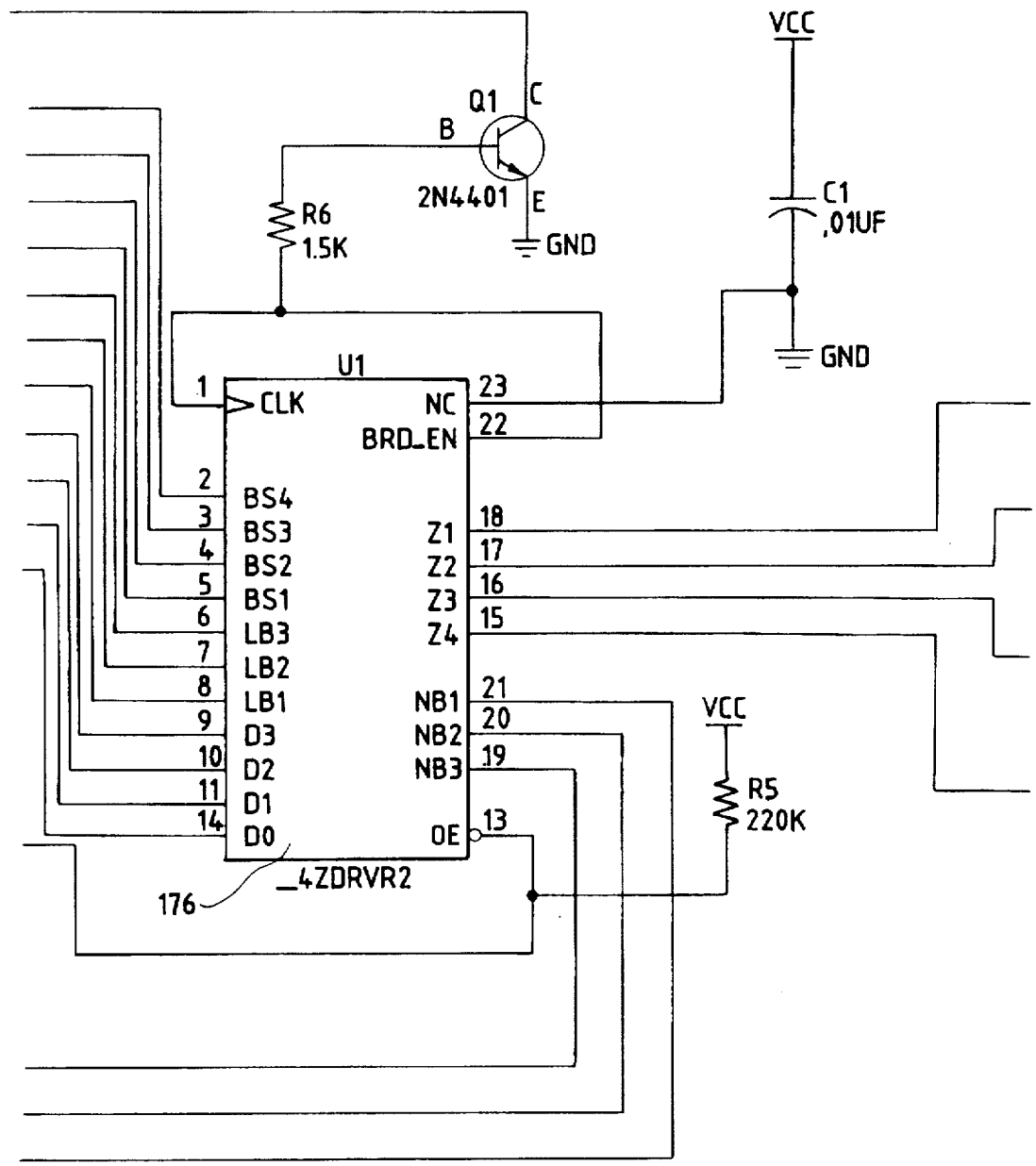
Figure 8C:
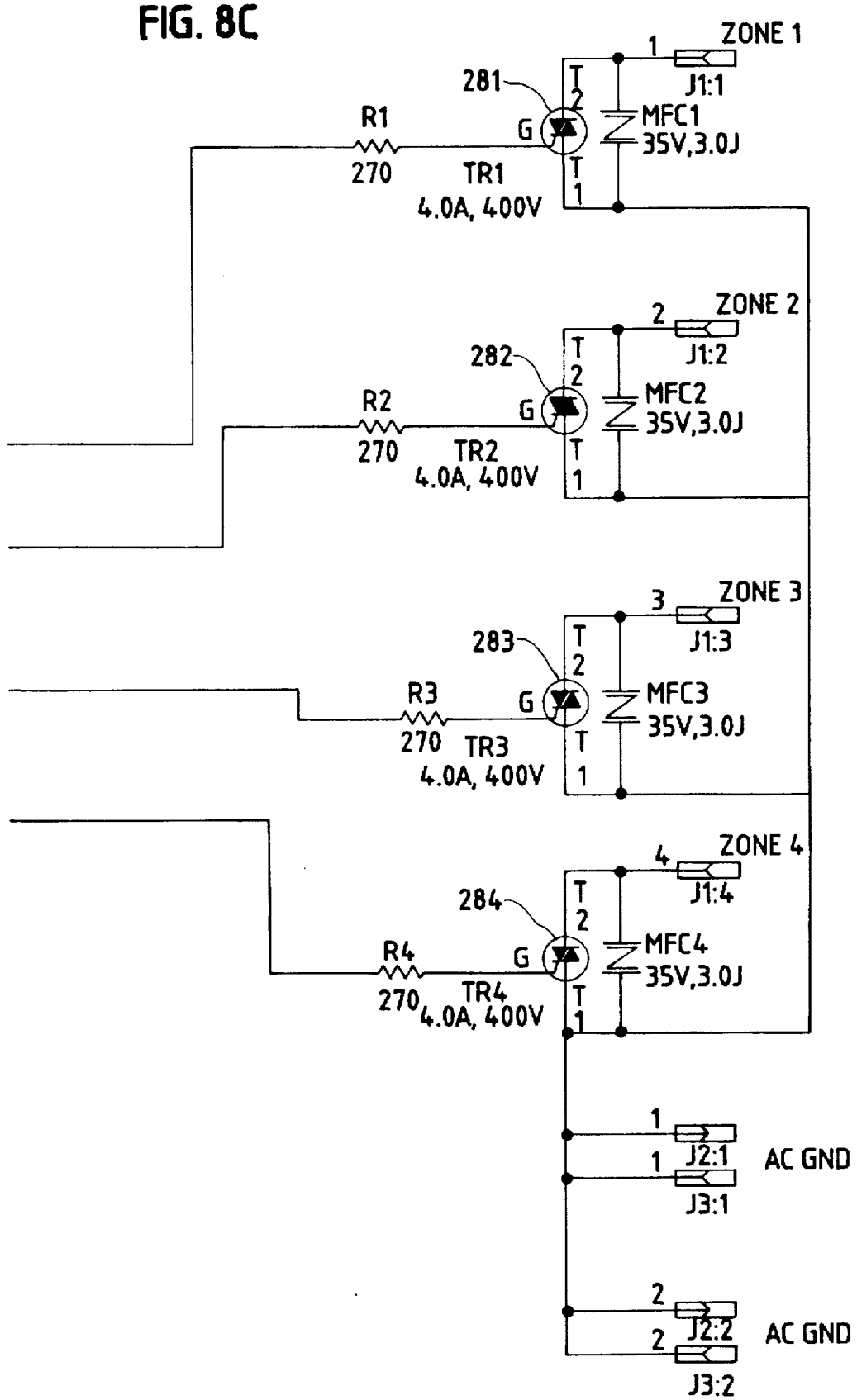

The circuit diagram for a typical add-on board such as add-on board 152 is shown in FIGS. 8A–8C. The sixteen line bus 220 is attached to the PAL chip 176. The sixteen line bus 220 continues through connector 174 and allows other add-on boards to be connected to the bus 220. The PAL chip 176 contains internal drivers to actuate switches such as TRIACs 281–284 which in turn drive electrically-operated devices such as irrigation sprinklers 39–42. The TRIACS 281–284 as well as the TRIACs 261–268 on the motherboard 150 are protected from lightning by a metal oxide varistor (MOV) with a snubber circuit serving as a high frequency filter.

Operation of the preferred embodiment will now be explained with reference to FIGS. 1–8, as described above. Pushing the reset switch 236 allows a user to have the controller 22 both adaptively ascertain the number of switches in communication with the controller 22 as well as configure the system to the specific number of switches. FIG. 9 is a flow diagram of the reset process beginning with step 300 where a user has initiated a reset. The registers in the microprocessor 182 and interface chip 162 are configured for designated data and communications are initiated between the interface chip 162 and microprocessor 182 in step 302. The processor 182 then determines whether the reset has been activated previously in step 304. If the reset has not been activated previously, the reset loads default values stored in the RAM 187 of the processor 182 in step 306. These default values include a real time of 12:00 A.M., a date of Jan. 1, a day of Monday, no run times, no start times, an everyday watering interval, 100% water budget, and the number of switches in the system. If the processor 182 determines the reset has been activated previously in step 304, the processor 182 loads the current values from the non-volatile memory 196 into the RAM 187 in step 308. The configuration of the add-on boards is then determined and loaded from the interface chip 162 in step 310.

The number of add-on boards and thus the total number of switches controlled is determined by the interface chip 162 querying the PALs mounted on the add-on boards via the three LST_BRD lines on the parallel bus 220. Upon receiving a signal (000) from the interface chip 162 on the LST_BRD lines, the PAL 176 on the first add-on board 152 will identify itself as the first add-on board. The PAL 176 will then increment the signal by one and send the new signal (001) to the next add on board across the LST_BRD lines. Receipt of the incremented signal allows the PAL on the second add-on board to identify itself as the second board in sequence. The PAL on the second add-on board then increments the signal (010) to be sent on to the next add-on board. This process is repeated until the last add-on board is reached, at which point, the PAL of the last add-on board determines that it is the last add-on board and sends a signal back to the interface chip 162. In this manner, even if one or more PALs or add-on boards are not functioning, this system can still configure the operational PALs and boards by skipping the non-functional board or boards.

The interface chip 162 then sends the total number of switches to the microprocessor 182. The total number is the number of switches on the motherboard 150 and the switches on all the attached add-on boards, if any. The microprocessor 182 then sets the maximum number of zones which may be selected by the user. Although, the three LST_BRD lines allow for a maximum identification of seven add-on boards, different coding schemes using the data and address lines of the parallel bus 220 will allow this method to identify and operate additional add-on units.

After the configuration has been loaded from the interface chip 162, the microprocessor 182 initiates the learn mode in step 312. The learn mode utilizes the power management circuit 252 to detect the loads across all the switches determined by the configuration function above. Those include TRIAC 276 (the pump 26), TRIAC 274 (master valve 30), and the remainder of the TRIACs 261–268 on the motherboard 150 as well as all of the TRIACs located on any add-on boards. The load across each of these TRIACS is determined by switching on the specific TRIAC to be tested. A circuit is completed by the return line connected to the resistor 258 of the power management circuit 252. The expected operating current across the resistor 258 is measured by the power management circuit 252 producing an analog signal which is sent to the analog to digital block 206 of the interface chip 162. The analog signal from the power management circuit 252 is then converted to a digital value and transmitted to the processor 182 which stores the expected operating current load value for that switch.

In this manner, the processor 182 learns the current loads of the master valve 30, the pump 26, and all electrically-operated devices connected to the eight TRIACs 261–268 on the motherboard 150 and the additional TRIACs on add-on boards. The TRIACs for the pump 26, the master valve 30, and any other TRIAC need not be connected if desired. For those TRIACs which do not have loads attached, the learn mode, in the preferred embodiment, will record no load value for any current under 0.09 amp. The processor 182 also determines whether the total current of all the loads on a TRIAC exceeds a safety threshold. The individual values are stored by the processor 182 in RAM and non-volatile memory 196 for use in the status program described below.

In the preferred embodiment, the TRIACs (261–268, 270, 274, and 281–284) each are capable of operating up to three solenoid valves sized for 0.24 amps at 24 volts AC each. However, it is to be understood that other types of switches may be used that will increase the magnitude of the loads that may be controlled.

After the learn mode is completed for all of the devices connected to the TRIACs in the particular system, the controller 22 is ready to accept user-defined programs. The user may enter up to four user-defined programs, designated A, B, C and S. Of course the system may be configured to accept and run greater numbers of user-defined programs if desired. The operating system on the microprocessor 182 allows any of the four programs to control any or all of the electrically-operated devices that are operated by the controller 22. In the preferred embodiment, the A, B, and C programs may be traditional irrigation programs that are used to group plant material or areas of similar watering requirements such as sun, shade, rotors, sprays, or the like. The S program may be run simultaneously with any of the other three programs. The S program is thus useful for applications such as drip irrigation. When the C and S programs are run, the pump 26 may be disabled by the switches 244 and 246 on motherboard 150.

The programming keys on the programming keypad 80 allow a user to input specific parameters in any of the four programs. However, in order properly to synchronize watering times, several keys allow a user to first set initial time, day and date information. The time key 118 will cause the time block 90 on screen 68 to blink. The control keys 136 and 138 then allow a user to scroll to the correct time. The current day key 120 allows the user to select the current day by scrolling through the days of the week displayed on the schedule block 68 of screen 68. The date key 122 allows a user to set the date by using control keys 136 and 138 to scroll to the proper date.

The controller 22 allows a user to choose one of three scheduling options. First, depressing the daily key 124 allows a user to choose which days of the week to water, e.g., Monday, Wednesday, Friday, etc., by selecting days via the control keys 136 and 138. The selected day or days will be highlighted in the scheduling block 98. Second, by depressing the odd/even key 126, the scheduling block in screen 68 will toggle between odd and even. The odd/even option activates the controller 22 on either the odd or even days of the month. Finally, by pressing the interval key 128, a number will be displayed in the interval block 104 in screen 68. The control keys 136 and 138 may be used to select different intervals of days to run the selected program, for example, every 2 days.

For each user-defined program, the user then selects the zones that will be activated by the controller 22. It is to be understood that the term "zone" as used herein with regard to the preferred embodiment refers to an electrically-operated device or group of devices connected to a single switch. The corresponding zone run time for each zone is entered by pressing the run time key 130. The current zone will be displayed and the run time will flash on the zone/run time block 94 on the screen 68. The run time for that zone may be adjusted using the control keys 136 and 138. A different zone may be selected by using the zone number control keys 114 and 116.

Additionally, a test cycle for cycling through all of the zones may be initiated by pressing the run time key 130 and pressing and releasing the zone on/off key 110. During this test cycle, a three minute run time will flash on the screen 68. This three minute run time may be adjusted using control keys 136 and 138. The controller 22 will then operate all the zones in sequence for the test cycle.

The intervals for all the run times of a particular program may be lengthened or shortened by a certain percentage using the water budget key 132. This feature is useful to adapt a program to changes in weather. The water budget key 132 highlights the water budget block 102 in screen 68. This percentage may be adjusted via the control keys 136 and 138.

Finally, a program may be run up to four times a day. The user may select up to four start times by using the start time keys 134. The start time block 92 will be highlighted on the screen 68 and the start times may be entered using the control keys 136 and 138.

After a user has finished entering the program parameters such as zones, run times, intervals, etc., for any or all of the four irrigation programs, the processor 182 sorts the entered information and stacks the run times and associated zones according to all of the current the processor 182 prioritizes the run times of the selected zones. In a conflict, the priority is set in order of program then start time. The exception is the S program, which will run simultaneously with the other user programs.

The stack of run times and zones is recompiled if a user modifies any of the parameters of the A, B, or C programs. The current user programs are stored in the RAM 187 of the microprocessor 182. Additionally, the user programs are copied to non-volatile memory 196 when a new program is created, a program is modified, or every half an hour.

As noted above, the user creates user-defined irrigation control programs relating to the selection and operation of electrically-operated devices such as sprinklers using the programming keypad 80 on the control panel 66. The operation function keypad 82 allows the user to control the operation of the irrigation system independently of the user-defined programs. The off/on sensor override key 106 will turn the controller 22 on, allowing a user to enter parameters into the user-defined programs. The off/on sensor override key 106 also allows a user to continue operation of a program even if the sensor 50 has suspended watering. The program on/off key 108 allows a user to manually run an entire program. Once the program key 108 is pressed, the displayed program letter (A, B, C or S) will blink on the program block 96 of the screen 68 and begin to run after a 5 second interval. A user may select a different program by pressing the next program key 112 to scroll through the four programs. The selected program will override any currently running program.

The zone on/off key 110 allows a user to operate a specific zone at any time regardless of the currently running program. The specific zone number selected will be displayed on the zone run time block 94 of the screen 68. The zone number may be changed by using zone number control keys 114 and 116. The selected zone number will be irrigated according to the time selected. The time is selected by using control keys 136 and 138 and may be adjusted by 1 minute increments. The time may be adjusted by different time increments by changing control parameters.

The next program key 112 allows a user to select any of the four programs for review. Pressing the next program key 112 for an interval of greater than 3 seconds will allow a user to review the designated program. The start times for that program will be scrolled on the time block 90 of the screen 68. The zone run times included in the chosen program will also be displayed on the zone/run time block 94 on the display 68. The accumulated run time will be displayed in the time block 90 on the screen 68. This allows the user to note the total run time of the current user-defined program.

The front panel 66 may be removed from the box 62 in order for a user to enter user-defined programs off site. The front panel 66 may be transported to a remote location and programmed out of the operating environment, providing voltage is connected to the front panel. Alternatively, programs may be loaded to program the processor 182 by a computer, or other input devices via an intelligent add-on unit connected in the same manner as an add-on board such as add-on board 152. Once the programs are loaded, the front panel 66 may be transported back to the location of the box 62 and reinstalled.

After the programs have been entered, the operating program of the microprocessor 182 initiates operation of the controlled devices according to the first run time of any of the stored user-defined programs. At the first run time, the microprocessor determines which zone or zones (in the case of a simultaneous program) should be operated and sets the run time for that zone or zones. After initiating communications with the interface chip 162 as will be described below, command data is generated and sent across lines D0–D3 of the bus 240. The command data sent to the interface chip 162 tells how many zones to turn on as well as which zones based on the current user-defined program. An actuation signal representing the selected zone is sent across lines D0–D3 during the duration of the run time of that zone. Because a 4 bit word may be sent, up to 63 devices including the master valve 30 and pump 26 may be separately operated by the processor 182. Of course other parallel coding schemes may be employed in order to increase the number of devices to be controlled.

The command data is received by the interface chip 162. The interface chip 162 determines whether the devices to be operated are connected to the motherboard 150, e.g., TRIAC 272 (master valve), TRIAC 276 (pump), or TRIACs 261–68 (zones 1–8). If the device is connected to the motherboard, the interface chip 162 actuates the appropriate TRIAC into an open position, thus allowing current to run to the attached electrically-operated device or devices connected thereto.

If the electrically-operated device is connected to one of the add-on boards, the interface chip 162 translates the actuation signal into an address and data signal relating to the selected driver on the appropriate add-on board. The interface chip 162 then sends an address signal across the three BRD__SEL lines and a data command across the four data lines D0–D3 of the parallel bus 220. The address signal is detected by the PALs of the add-on boards. If the PAL determines that the address signal corresponds to the address of that add-on board, the PAL reads the actuation data. The data lines have one line dedicated to each of the four TRIACs on each add-on board. Thus, assuming that the add-on board 152 is selected by the address signals, a high signal on D0 will cause the PAL 176 to drive TRIAC 281. If a different coding scheme with full 4 bit words on D0–D3, up to 63 switches may be operated. Greater that 63 switches may be operated with other coding schemes if desired.

Figure 10A:
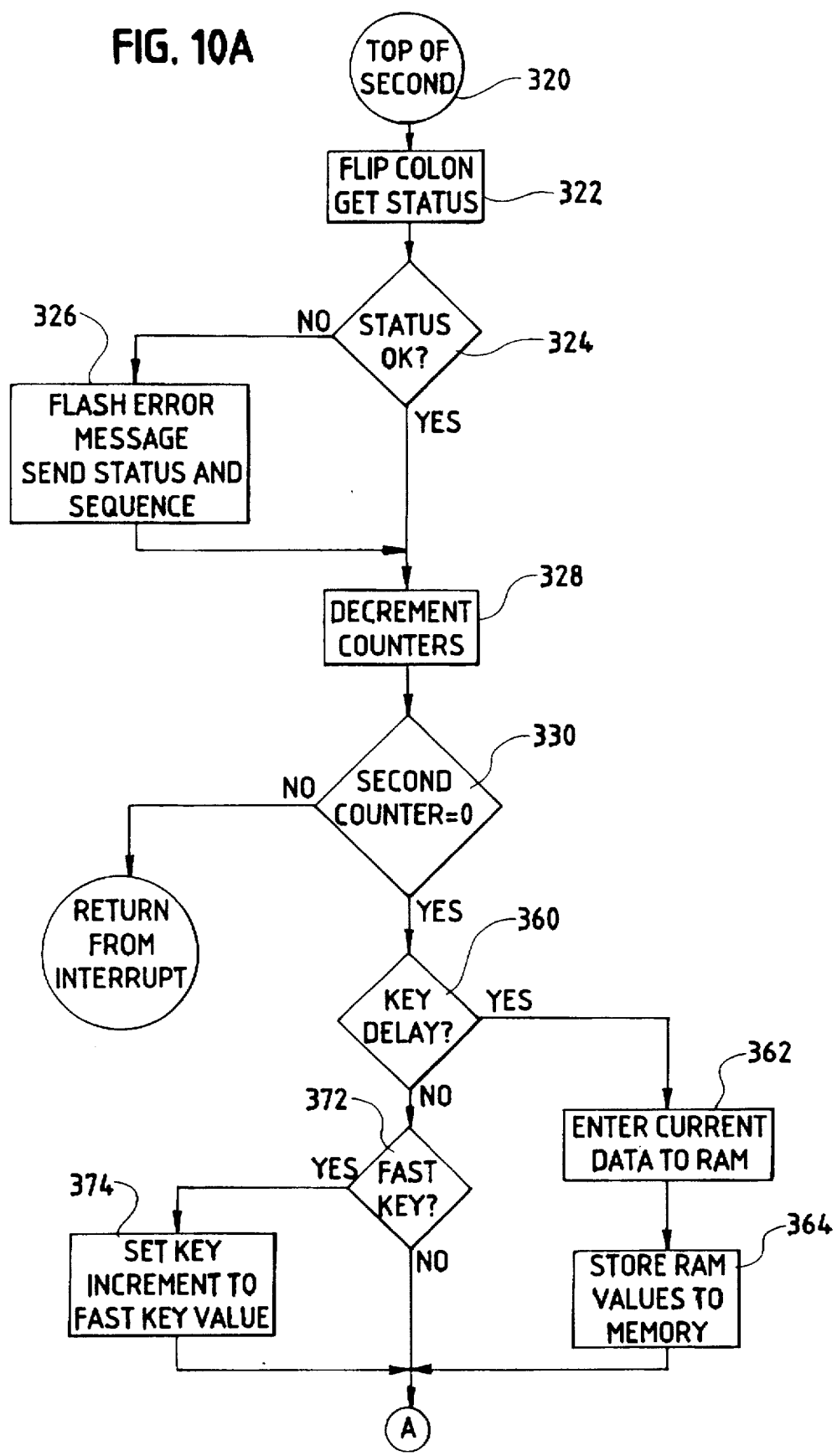
FIGS. 10A and 10B are flow diagrams of the operation sequence for the controller according to the present invention.
Figure 10B:
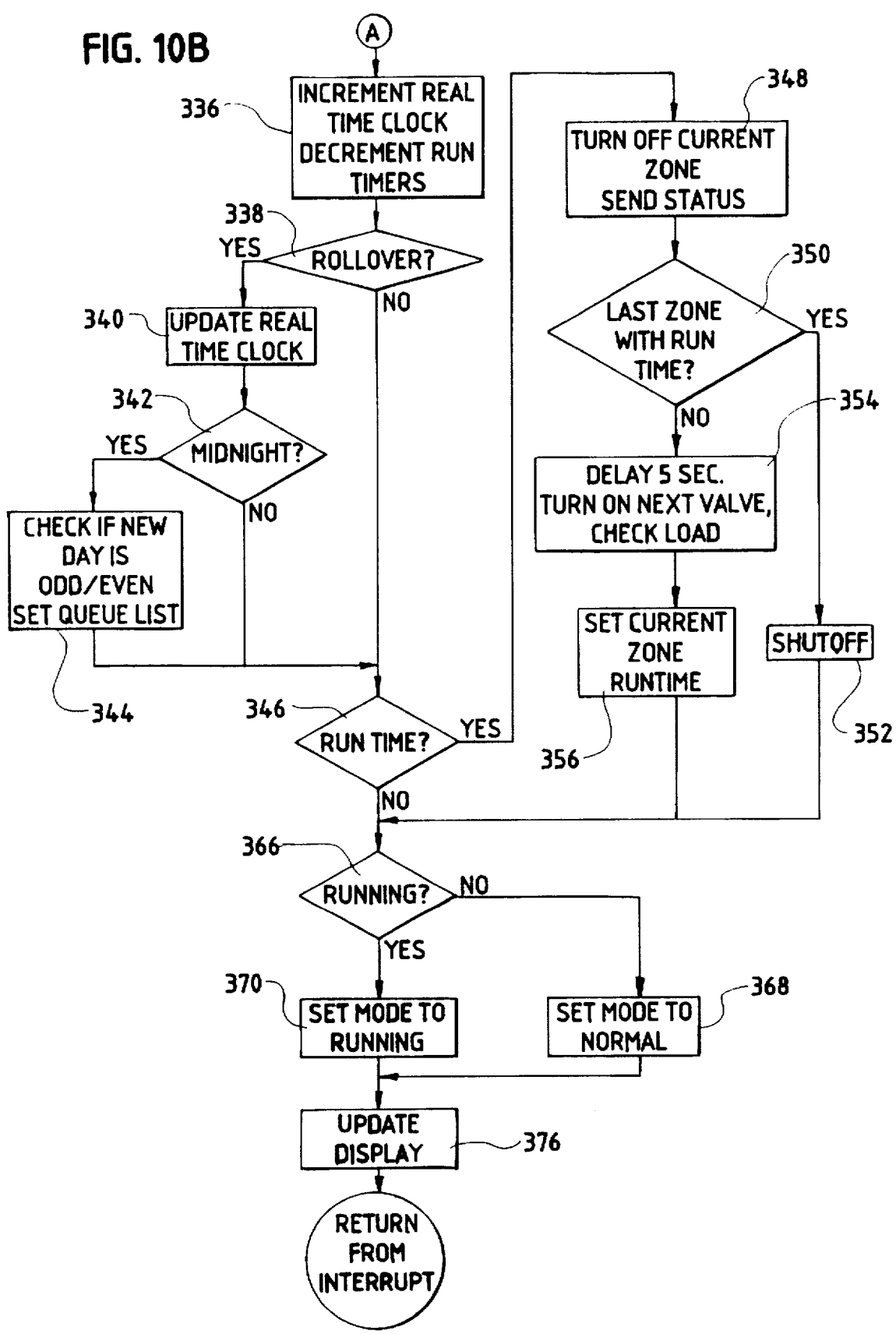

During operation, the system is checked by a series of timer interrupts which occur every 250 ms. A flow diagram of the system maintenance operation after a timer interrupt is shown in FIGS. 10A and 10B. The system starts a status check every second as in step 320. At the top of every second, a colon representation flashes between on and off in the time block 90 on screen 68 and a status request is made of the interface chip 162 in step 322. The processor 182 determines if the status signals from the interface 162 are normal in step 324.

In the preferred embodiment, the status is determined by using various sensors to check the electronic components of the system, thus providing a system monitor. Various errors may be determined and are displayed on the screen 68 to aid a user in failure diagnosis in step 236. For example, an E1 message indicates a communication error caused by the failure to sense a request to send or acknowledge between the interface chip 162 and the microprocessor 182. An E2 message indicates that no communication exists between microprocessor 182 and memory 196. An E3 message indicates a programming error; this error occurs if a user attempts to enter a run time for a TRIAC that does not have an electrical load, such as a valve or irrigation device, connected. The absence of a load on a particular TRIAC is determined during the learn mode. An E5 message indicates there is no AC power. This message is triggered by the AC sensor 250 attached to the interface chip 162. An E6 message indicates that watering has been suspended due to an input received from sensor 50. E7 indicates low battery, which is sensed by the interface chip 162. Finally, E8 indicates a valve failure. This error indicates that a particular TRIAC current/load detected by power management circuit 252 has changed significantly since it was learned.

If an error is determined in step 324, the processor 182 will display an error message on screen 68 in step 326 and send a status and appropriate reactive sequence to the interface chip 162. For example, in the case of no AC power (error message E5), the battery 170 is connected to the voltage source (VCC) for powering the panel board and the interface chip 162. The regulator 254 ensures that battery power is supplied to the panel board (VCC) and interface chip 162 while regulator 256 cuts off power (VCC1) to the TRIAC switches on motherboard 150 and the add-on boards, creating a sleep (low power) mode. The interface chip 162 also begins to monitor the battery level from the battery 170. The program then proceeds to step 328.

Assuming the status is normal or after the processor 182 communicates the corrective sequence to the interface chip, the countdown counters, such as run times, are decremented, while the internal timers are incremented in step 328. In step 330, a check is made as to whether the seconds counter is at zero. If the seconds counter has not been decremented to zero, the program returns from the timer interrupt.

If the seconds counter has been decremented to zero, the program proceeds to step 360. At step 360, the program determines whether there is a delay resulting from a user pressing an operation or programming key. If there is no key delay, the program proceeds to step 372. If there is a key delay, current data is written to RAM 187 based on the current function selected in step 362. In step 364, the RAM values are stored to the non-volatile memory 196. The program then proceeds to step 336.

In step 336, the real time clock is incremented and the times of the zones currently running are decremented. The program then determines whether a time rollover of the minute or hour of the real time clock has occurred in step 338. If rollover has not occurred, the program proceeds to step 346. If rollover has occurred, the program proceeds to step 340 where the time displayed in time block 90 on screen 68 is adjusted for the next minute and/or hour. The program then determines whether it is midnight in step 342. If it is not midnight the program proceeds to step 346. If it is midnight, the program checks if the new day is odd or even and determines if any conflicts exist between run times of different programs, and changes the stack if necessary in step 344. The program then proceeds to step 346.

Step 346 determines whether there is any run time left in the current zone/TRIAC which is on in any of the programs. If the run time has not expired, the program will proceed to step 366. If the run time has stopped, the program will turn off the current zone/TRIAC and send this status to the interface chip 162 in step 348. The program then determines if the selected zone is the last zone with an assigned run time in step 350. If the selected zone is the last zone, the interface chip 162 will turn all switches off in step 352 and return from timer interrupt. If the selected zone is not the last zone, the program will delay operation for a period of time, e.g., 5 seconds, and then turn on the next zone/TRIAC as well as send a status to the processor 182 in step 354. The delay interval between zones may be adjusted from between 5 to 30 seconds. The program will then set the current zone's run time in the run timer in step 356 and proceeds to step 366.

The program then determines whether a program is running in step 366 by checking status data stored in RAM 187. If a program is not running, the program sets the mode to normal in step 368 and proceeds to step 376. If the program is running, the program sets the mode to running in step 370 and proceeds to step 376. In step 376, the blocks of the screen 68 are updated with new information. The program then returns from the timer interrupt.

If there is no key delay in step 360, the program in step 372 determines whether the key has been pushed for greater than 8 seconds (fast key). If the key has not been depressed for 8 seconds, the program proceeds to step 336. If the fast key has been depressed, the key increment is set to the fast key value in step 374, and then proceeds to step 336.

Figure 11:
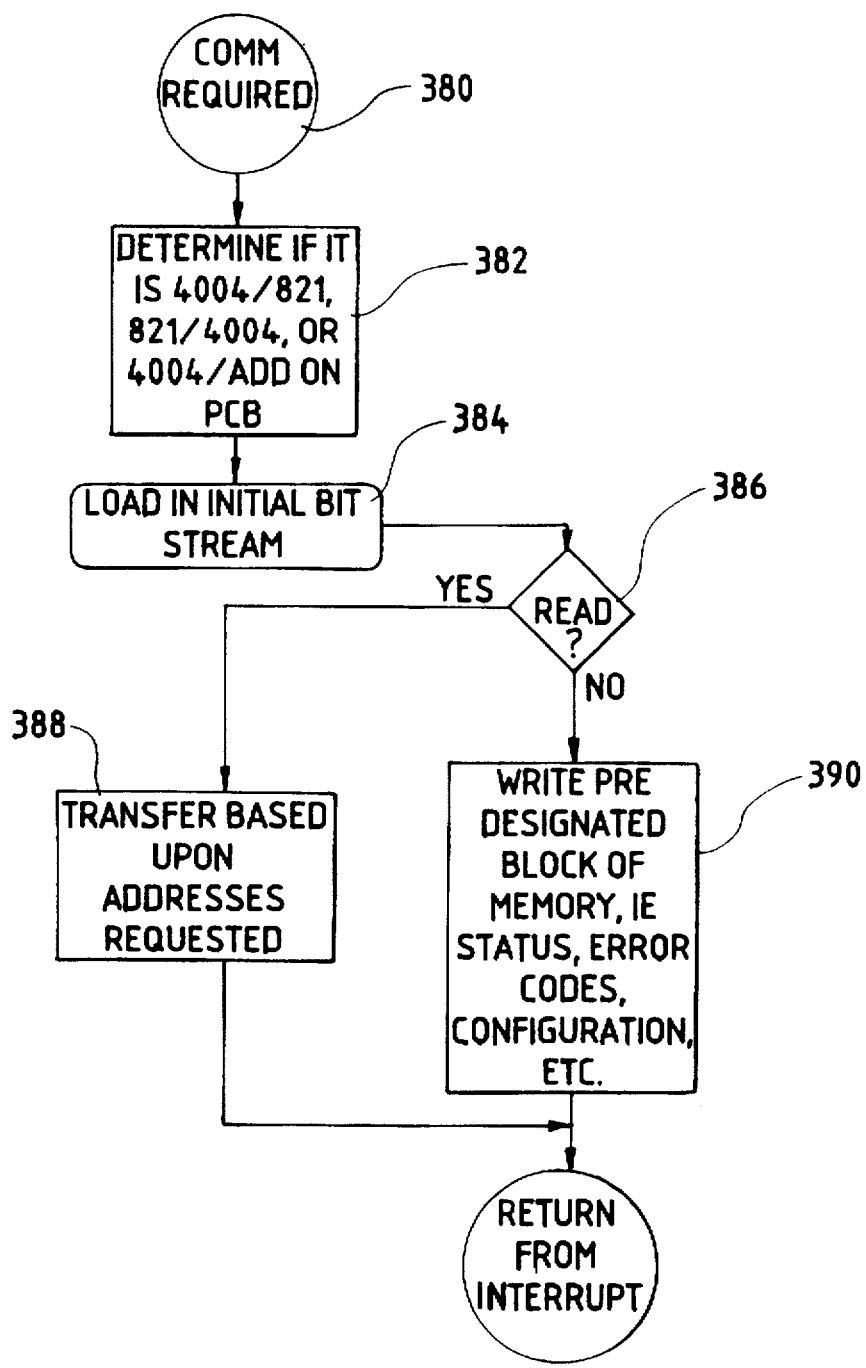
FIG. 11 is a flow diagram of the communications interrupt sequence of the present invention.

The various status messages between the processor 182 and the interface chip 162 require a specific communication sequence. Additionally, communications may be initiated by "intelligent" add-on boards, as will be described below, in a similar fashion. FIG. 11 shows a flow diagram of the communications sequence used by the system. The unit which desires to initiate communications sends an interrupt signal in step 380. Once the interrupt signal is sent, the program determines if the communications are between the interface chip 162 and the processor 182, or the processor 182 and the interface chip 162, or the interface chip 162 and an add-on board in step 382. The initial bit stream is then loaded on the appropriate communications bus in step 384. The communications processor determines whether the data is to read in step 386. If the data is to be read, a transfer of the data based on the requested register addresses in the processor 182 in step 388 is initiated. If the data is not a read, the data is written in a designated block of memory in step 390. Memory is reserved for status messages, error codes, configuration etc. In both cases, the program ends the interrupt and returns to normal function.

Program operation may be suspended by the user by selecting the manual mode as described above. A signal from the sensor 50 may also cause the processor 182 to stop program operation. In the preferred embodiment, the sensor 50 is a moisture sensor which when detecting moisture (e.g., rain) transmits a data signal when a predetermined level of moisture saturation is satisfied. The signal is sent to the interface chip 162 which in turn sends a signal to the processor 182 and suspends operation of the current running program. A user may override the sensor by depressing the on/off override key 106. Additional sensors for detecting other conditions such as sunlight, temperature, humidity, and the like, may be used for sensor 50 if the user wishes to override program operation based on these conditions. The operation program may be modified to allow user programs to accept overrides based on these conditions.

Different add-on units may be connected to the present invention. For example, a communications add-on unit may be connected to various sensors and sensor information may be transmitted to the microprocessor 182 through the interface chip 162. Data from such an add-on unit is transmitted through the parallel bus 220 to interface chip 162. In such a case, an external interrupt signal is sent by the PAL or the add-on unit intelligence via the EXT_INT line which allows the add-on unit to communicate with the processor 182 via the interface chip 162. User-defined programs may likewise be loaded from a communications add-on board. Such a board may also allow a user to control the irrigation system 20 from a remote location via a modem or radio by having the appropriate electronics on the add-on board.

A second embodiment of the present invention is shown in FIG. 12. In this embodiment, the controller 22 is a box 462 which increases the number of devices which controller 22 may operate. The box 462 may be constructed of rolled steel and includes a lid 464 that is provided with a gasket (not shown) providing a water tight seal when the lid 464 is closed.

The box 462 is shown with a front panel 466, a motherboard 550, and three add-on boards 552, 556, and 556. These components are identical to their counterparts in the first embodiment. A buffer board 558 is connected to the third add-on board 556. The buffer board 558 has a connector 560 which is coupled to the bus on the add-on board 556 and a connector 562 for further add-on boards such as add-on board 564, 570, 572 and 574. Add-on board 564 is identical to add-on boards 552, 556 and 558. A coverplate 468 is bolted over the box 462 to protect the motherboard 550 and any add-on boards.

The buffer board 558 has a buffer driver chip 566 as well as a voltage regulator 568. The buffer driver chip 566 amplifies the signals on the bus received on connector 560 and sends the signals on through connector 562 to the PAL on add-on board 564. The voltage regulator 568 is connected to the transformer on the motherboard 550 and supplies power to drive the TRIACs on the add-on board 564. This configuration allows up to four additional add-on boards 564, 570, 572, and 574. This configuration thus gives a full 36 zones of operation (motherboard and 7 add on boards). As noted above, having a larger box with additional buffer cards and changing program parameters may increase the number of zones for operation if desired.

It is to be understood that although the above embodiments contain hard wired connections between the switches on the motherboard and add-on units and the electrically-operated devices, the present invention is not limited to such a configuration. For example, the control network 24 in FIG. 1 may be accomplished through a radio transmitter transmitting signals to actuate the sprinklers 31–46. Such a configuration would require the sprinklers 31–46 to be coupled to an independent power source. Other wireless connections such as optical fibers, infrared transmission and the like may be used as well.

Additionally, the bus 220 between the motherboard 150 and the add-on boards 152 and other add-on boards in FIG. 5 is not limited to a hard wire configuration. The bus communication may be accomplished through non wire means such as be radio frequency transmission, infrared transmission, optical fiber or the like. In the case of such a wireless bus, the add-on boards may be located remotely from the controller 22 as long as a separate power source is provided in order to power the switches on the add-on boards.

The above described embodiments are merely illustrative of the principles of this invention. Other arrangements and advantages may be devised by those skilled in the art without departing from the spirit and scope of the invention. Accordingly, the invention should be deemed not to be limited to the above detailed description but only by the spirit and scope of the claims which follow.

What is claimed is:

1. A control system for controlling a variable number of zones of electrically-operated devices, each zone including at least one electrically-operated device, the control system comprising:

a processor unit including a memory for storing a user-defined program relating to selection and operation of the zones of electrically-operated devices, the processor unit generating command data in accordance with the user-defined program for the selection and operation of the zones of electrically-operated devices; and a set of switches in communication with the processor unit, each switch capable of having the at least one electrically-operated device of a corresponding one of the zones connected thereto for operation of the connected electrically-operated device upon actuation of the switch;

wherein the processor unit ascertains the total number of switches in communication therewith by sending a query signal and receiving a signal in response to the query signal indicative of the total number of switches in communication therewith and limits the variable number of zones selected and controlled by the user-defined program to the ascertained total number of switches.

2. The control system of claim 1 further comprising an interface for receiving the command data from the processor unit relating to the selection and operation of the zones of electrically-operated devices in accordance with the user-defined program, the interface identifying the switch connected to the electrically-operated device of the zone selected by the user-defined program and sending an actuation signal to actuate the identified switch for operation of the electrically-operated device of the selected zone.

3. The control system of claim 2 further comprising an removable add-on unit operatively connected to the interface and in communication with the processor unit, the removable add-on unit including at least one switch capable of having the at least one electrically-operated device of an additional zone connected thereto for operation of the connected electrically-operated device upon actuation of the switch of the add-on unit, the total number of switches ascertained by the processor unit being cumulative of the set of switches and the at least one switch of the add-on unit.

4. The control system of claim 3, wherein the interface further identifies when the switch connected to the electrical device of the zone selected by the user-defined program is included on the add-on unit and sends an actuation signal to the add-on unit to actuate the identified switch for operation of the electrically-operated device of the selected zone.

5. The control system of claim 4, wherein the add-on unit includes a program array logic device for receiving the actuation signal from the interface, identifying the switch connected to the electrically-operated device of the zone selected by the user-defined program, and translating the actuation signal to the identified switch for operation of the electrically-operated device of the selected zone.

6. The control system of claim 5, wherein the add-on unit further includes a parallel bus for connecting additional add-on units thereto, the program array logic device identifying when the switch connected to the electrically-operated device of the zone selected by the user-defined program is included on the additional add-on units and translating the actuation signal to the additional add-on units to actuate the identified switch for operation of the electrically-operated device of the selected zone.

7. The control system of claim 5, wherein the interface sends the actuation signal to the add-on unit by radio frequency transmission.

8. The control system of claim 1 further comprising a system monitor in communication with the switches for detecting a current load value across each switch and storing an expected operating current load value for each switch, the system monitor initially detecting and storing the expected operating current load value for each switch and then comparing subsequent current load values received for each switch with the corresponding stored expected operating current load value to identify discrepancies therebetween.

9. The control system of claim 1 further comprising a second set of switches in communication with the processor unit, each switch capable of having at least one electrically-operated device connected thereto for operation of the connected electrically-operated device upon actuation of the switch, wherein the total number of switches ascertained by the processor unit does not include the second set of switches.

10. The control system of claim 1 further comprising a sensor in communication with the processor unit, the sensor transmitting a data signal to the processor unit when a predetermined condition is satisfied so as to suppress the processor unit from generating command data in accordance with the user-defined program.

11. The control system of claim 10, wherein the sensor senses moisture and transmits a data signal when a predetermined level of moisture saturation is satisfied.

12. The control system of claim 1, further comprising a keypad in communication with the processor unit for entry of operating parameters of the user-defined program relating to the selection and operation of the zones of electrically-operated devices.

13. The control system of claim 12, wherein the operating parameters entered by the keypad include the selection of one of the zones of electrically-operated devices and a start time and a duration of operation for the electrically-operated device of the selected zone.

14. The control system of claim 13, wherein the operating parameters entered by the keypad further include the selection of additional zones of electrically-operated devices and a duration of operation for the electrically-operated device of each additional selected zone, and further wherein the processor unit prioritizes and cumulatively stacks operation of the electrically-operated devices of the selected zones such that the electrically-operated devices of the selected additional zones operate sequentially.

15. The control system of claim 12 further including a selector switch in communication with the processor unit for selecting between a standard time format and military time format.

16. The control system of claim 12 further including a selector switch in communication with the processor unit for selecting between an hour-minute format and a minute-second format.

17. The control system of claim 12, wherein the processor unit and the keypad are removable from the set of switches to allow entry of the operating parameters at a location remote from the remainder of the control system.

18. The control system of claim 1 further comprising a single display for displaying at least one of the operating parameters of the user-defined program relating to the selection and operation of zones of electrically-operated devices.

19. The control system of claim 1 further comprising a non-volatile memory for backup storage of the user-defined program.

20. The control system of claim 1, wherein at least one of the electrically-operated devices is a valve component.

21. The control system of claim 1, wherein at least one of the electrically-operated devices is a light component.

22. A removable add-on unit for use with a control system that controls a variable number of zones of electrically-operated devices, each zone having at least one electrically-operated device connected to a corresponding switch, the control system including a processor unit generating command data in accordance with a user-defined program relating to selection and operation of the zones of electrically-operated devices and an interface receiving the command data from the processor unit and identifying the switch connected to the electrically-operated device of the zone selected by the user-defined program, the interface sending an actuation signal to actuate the identified switch for operation of the electrically-operated device of the selected zone, the removable add-on unit comprising:

a connector operatively connecting the removable add-on unit to the interface for two way communication with the processor unit;

at least one switch capable of having the at least one electrically-operated device of an additional zone connected thereto for operation of the connected electrically-operated device upon actuation of the switch; and a program array logic device for receiving the actuation signal from the interface, identifying the switch connected to the electrically-operated device of the zone selected by the user-defined program, and translating the actuation signal to the identified switch for operation of the electrically-operated device of the selected zone,wherein the program array logic device sends an identification signal to the interface.

23. The add-on unit of claim 22 further comprising a second connector for connecting additional add-on units thereto in parallel, the program array logic device identifying when the switch connected to the electrically-operated device of the zone selected by the user-defined program is included on the additional add-on units and translating the actuation signal to the additional add-on units to actuate the identified switch for operation of the electrically-operated device of the selected zone.

24. An irrigation system for irrigating a variable number of zones, the irrigation system comprising:

a plurality of electrically-operated valves for regulating the supply of water, each zone including at least one electrically-operated valve; and a control system for controlling the plurality of electrically-operated valves, the control system including:

a processor unit including a memory for storing a user-defined program relating to selection and operation of the zones of electrically-operated valves, the processor unit generating command data in accordance with the user-defined program for the selection and operation of the zones of electrically-operated valves, and a set of switches in communication with the processor unit, each switch capable of having the at least one electrically-operated valve of a corresponding one of the zones connected thereto for operation of the connected electrically-operated valve upon actuation of the switch, wherein the processor unit ascertains the total number of switches in communication therewith by sending a query signal and receiving a signal in response to the query signal indicative of the total number of switches in communication therewith and limits the variable number of zones selected and controlled by the user-defined program to the ascertained total number of switches.

25. The irrigation system of claim 24 further comprising an interface for receiving the command data from the processor unit relating to the selection and operation of the zones of electrically-operated valves in accordance with the user-defined program, the interface identifying the switch connected to the electrically-operated valve of the zone selected by the user-defined program and sending an actuation signal to actuate the identified switch for operation of the electrically-operated valve of the selected zone.

26. The irrigation system of claim 25 further comprising an removable add-on unit operatively connected to the interface and in communication with the processor unit, the removable add-on unit including at least one switch capable of having the at least one electrically-operated valve of an additional zone connected thereto for operation of the connected electrically-operated valve upon actuation of the switch, the total number of switches ascertained by the processor unit being cumulative of the first set of switches and the at least one switch of the add-on unit.

27. The irrigation system of claim 26, wherein the interface further identifies when the switch connected to the electrically-operated valve of the zone selected by the user-defined program is included on the add-on unit and sends an actuation signal to the add-on unit to actuate the identified switch for operation of the electrically-operated valve of the selected zone.

28. The irrigation system of claim 27, wherein the add-on unit includes a program array logic device for receiving the actuation signal from the interface, identifying the switch connected to the electrically-operated valve of the zone selected by the user-defined program, and translating the actuation signal to the identified switch for operation of the electrically-operated valve of the selected zone.

29. The irrigation system of claim 28, wherein the add-on unit further includes a parallel bus for connecting additional add-on units thereto, the program array logic device identifying when the switch connected to the electrically-operated valve of the zone selected by the user-defined program is included on the additional add-on units and translating the actuation signal to the additional add-on units to actuate the identified switch for operation of the electrically-operated valve of the selected zone.

30. The irrigation system of claim 24 further comprising a system monitor in communication with the switches for detecting a current load value across each switch and storing an expected operating current load value for each switch, the system monitor initially detecting and storing the expected operating current load value for each switch and then comparing subsequent current load values received for each switch with the corresponding switch to identify discrepancies therebetween.

31. A method of controlling a variable number of zones of electrically-operated devices in accordance with a user-defined program relating to selection and operation of the zones of electrically-operated devices, each zone including at least one electrically-operated device, the method comprising the steps of:

providing a set of switches, each switch capable of having the at least one electrically-operated device of a corresponding one of the zones connected thereto for operation of the connected electrically-operated device upon actuation of the switch;

ascertaining the total number of switches provided by sending a query signal and receiving a signal in response to the query signal indicative of the total number of switches in communication therewith;

limiting the variable number of zones selected and controlled by the user-defined program to the identified total number of switches; and generating command data in accordance with the user-defined program for the selection and operation of the zones of electrically-operated devices.

32. The method of claim 31 further comprising the step of:
connecting the set of switches to an interface for receiving the generated command data, the interface identifying the switch connected to the electrically-operated device of the zone selected by the user-defined program and sending an actuation signal to actuate the identified switch for operation of the electrically-operated device of the selected zone.

33. The method of claim 32 further comprising the steps of:

including at least one switch on an add-on unit, the at least one switch capable of having the at least one electrically-operated device of an additional zone connected thereto for operation of the connected electrically-operated device upon actuation of the switch, such that the total number of switches ascertained during the ascertaining step is cumulative of the set of switches and the at least one switch of the add-on unit; and connecting the add-on unit operatively to the interface, wherein the interface further identifies when the switch connected to the electrically-operated device of the zone selected by the user-defined program is included on the add-on unit and sends an actuation signal to the add-on unit to actuate the identified switch for operation of the electrically-operated device of the selected zone.

34. The method of claim 33 further comprising the steps of connecting additional add-on units in parallel to the first add-on unit;

determining when the switch connected to the electrically-operated device of the zone selected by the user-defined program is included on one of the additional add-on units; and translating the actuation signal to the additional add-on units to actuate the identified switch for operation of the electrically-operated device of the selected zone.

35. The method of claim 31 further comprising the steps of:

detecting initially an expected operating current load value for each switch;

storing the expected operating current load value for each switch; and comparing subsequent current load values detected for each switch with the corresponding stored expected operating current load value to identify discrepancies therebetween.

36. The method of claim 31 further comprising the steps of:

sensing for a predetermined operating condition; and suppressing the generating step from generating command data in accordance with the user-defined program when the predetermined operating condition is satisfied.

* * * * *

UNITED STATES PATENT AND TRADEMARK OFFICE
CERTIFICATE OF CORRECTION

PATENT NO. : 5,748,466  
DATED : May 5, 1998  
INVENTOR(S) : McGivern et al.

Page 1 of 2

Figure 7:
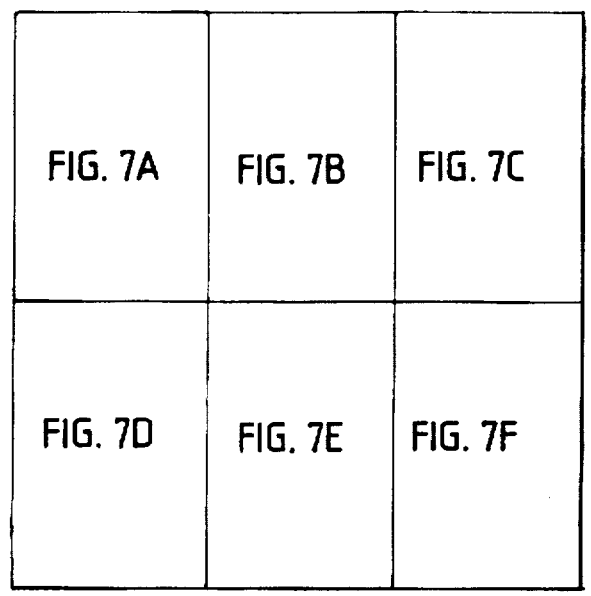
FIGS. 7A–7B are a circuit diagram of the mother board according to the present invention.
Figure 7A:
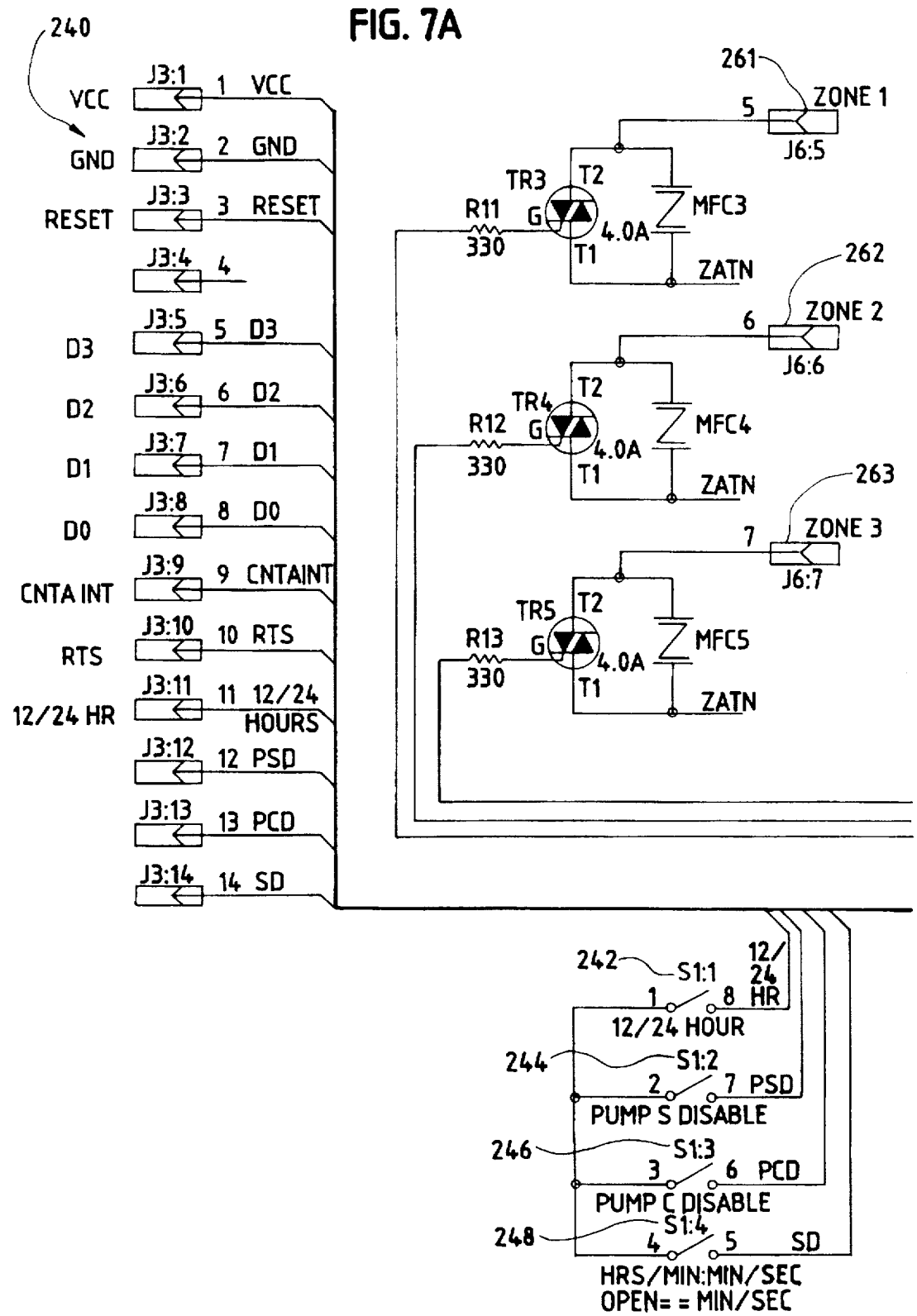
Figure 7B:
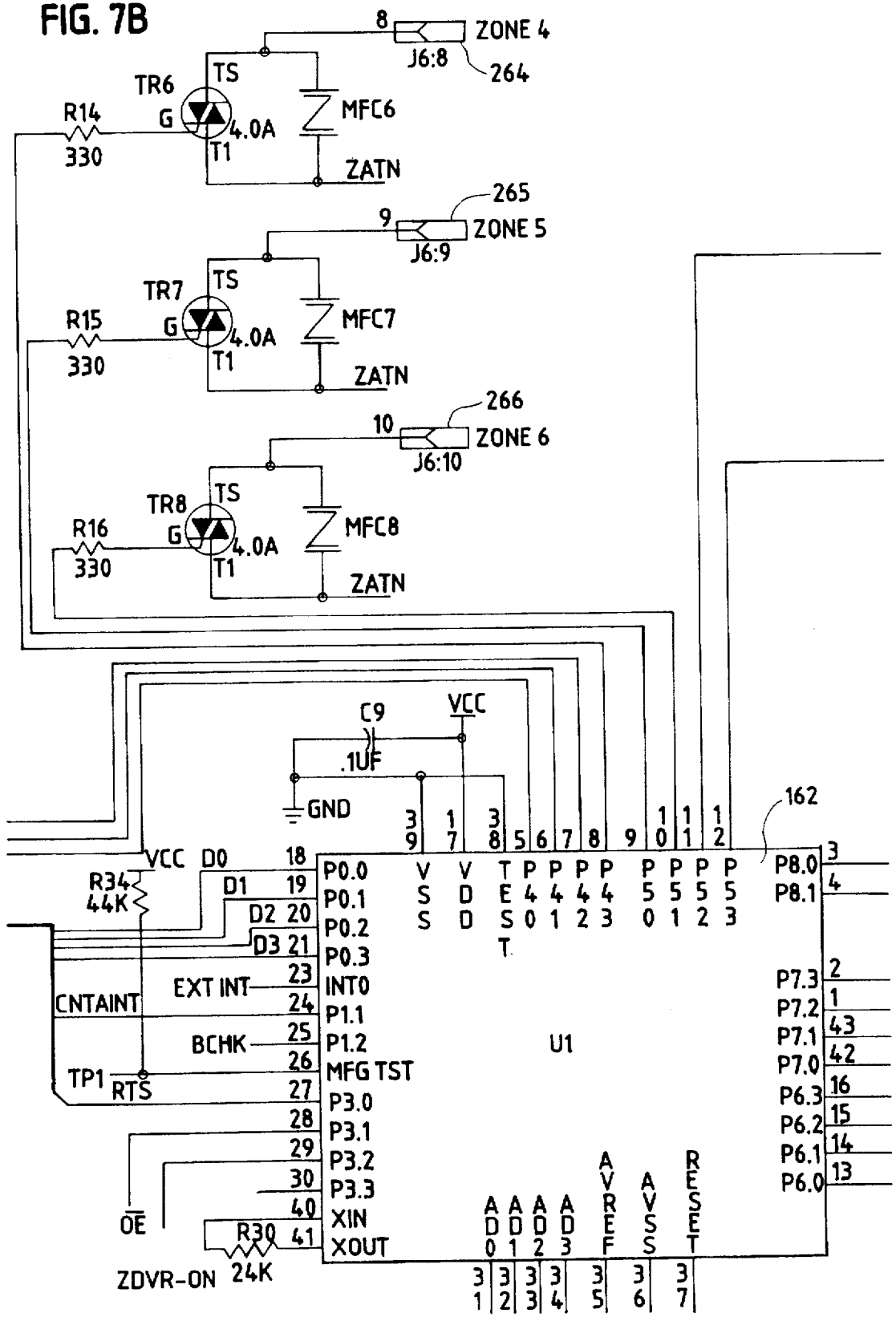
Figure 7D:
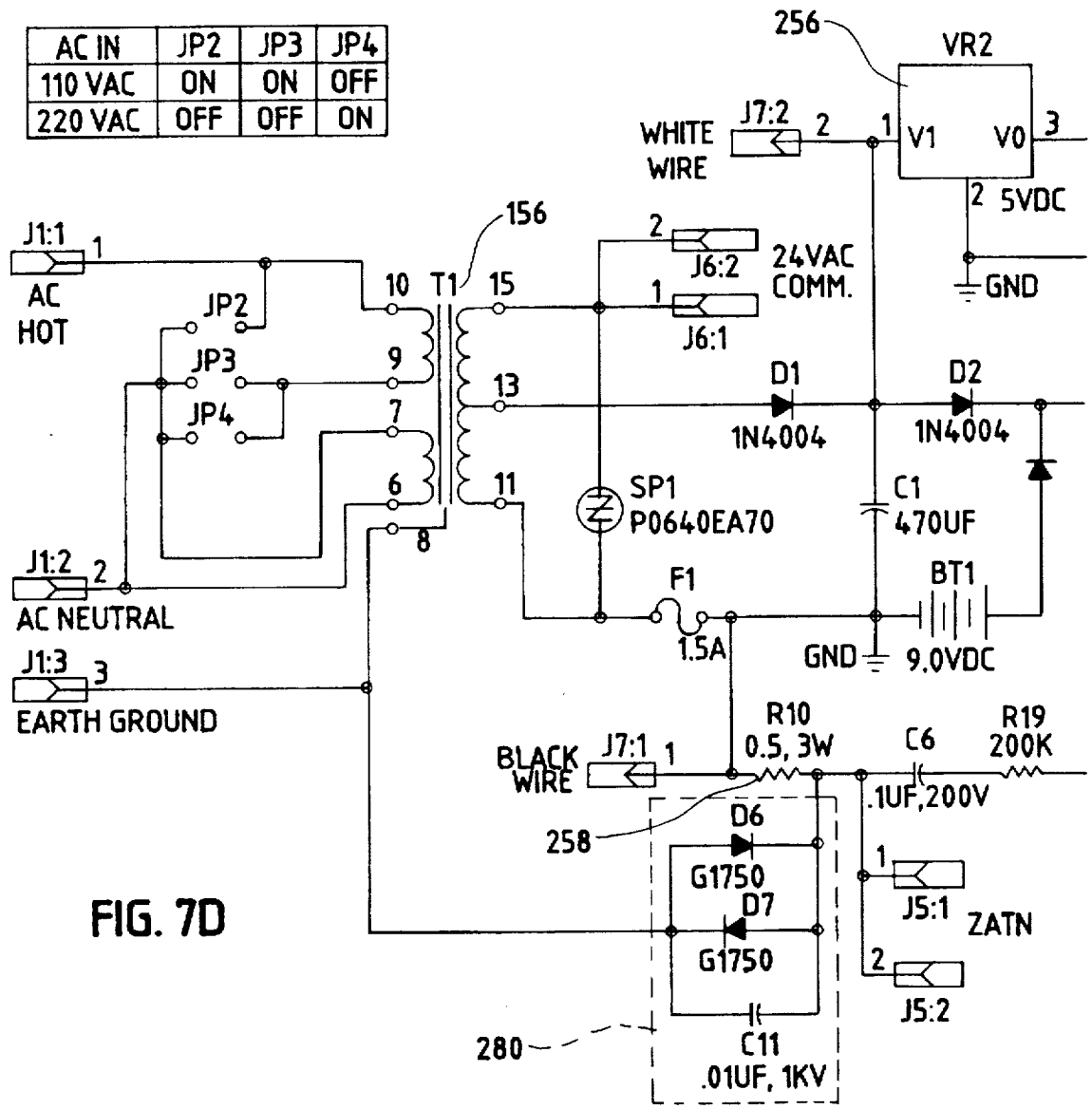
Figure 7E:
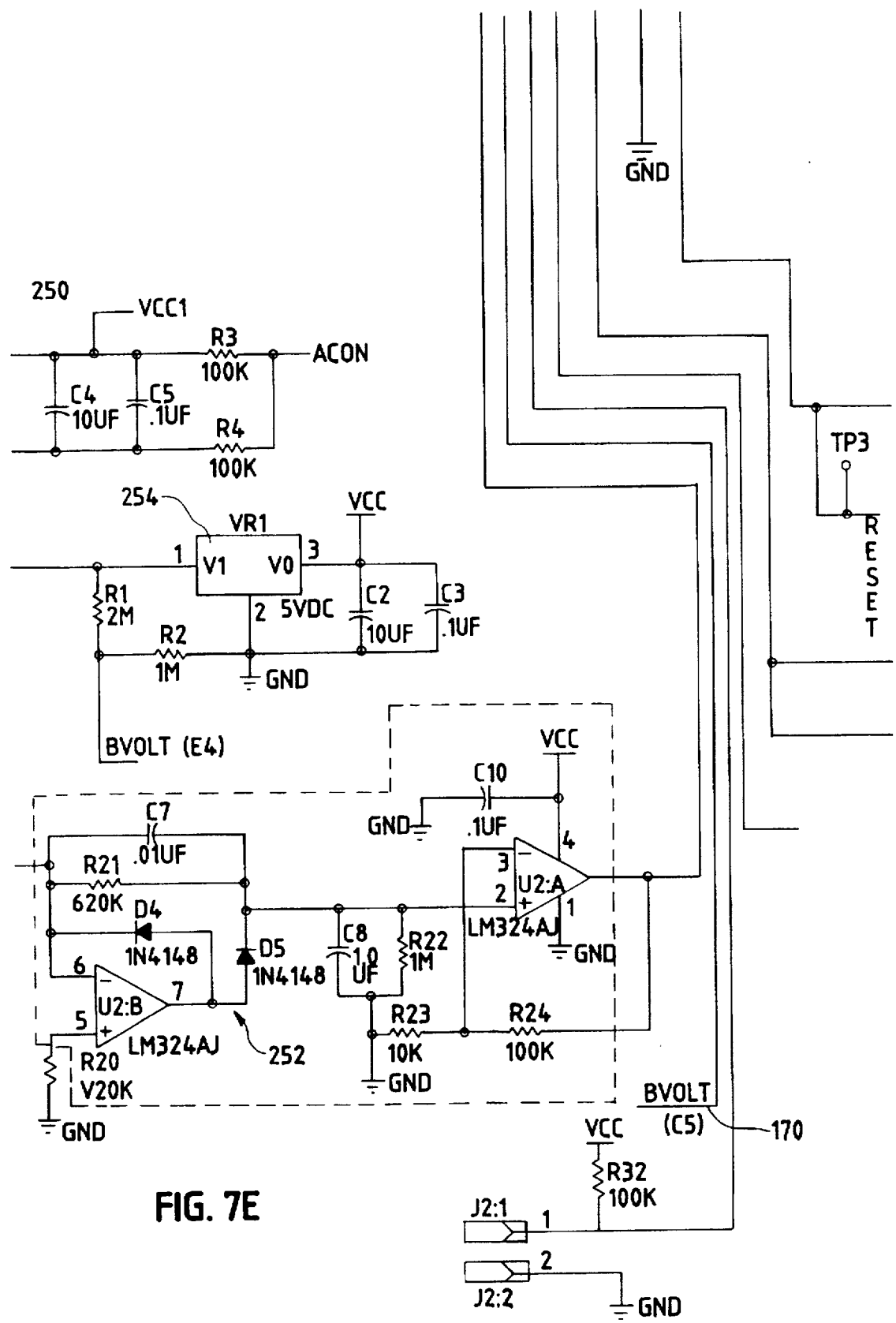
Figure 7F:
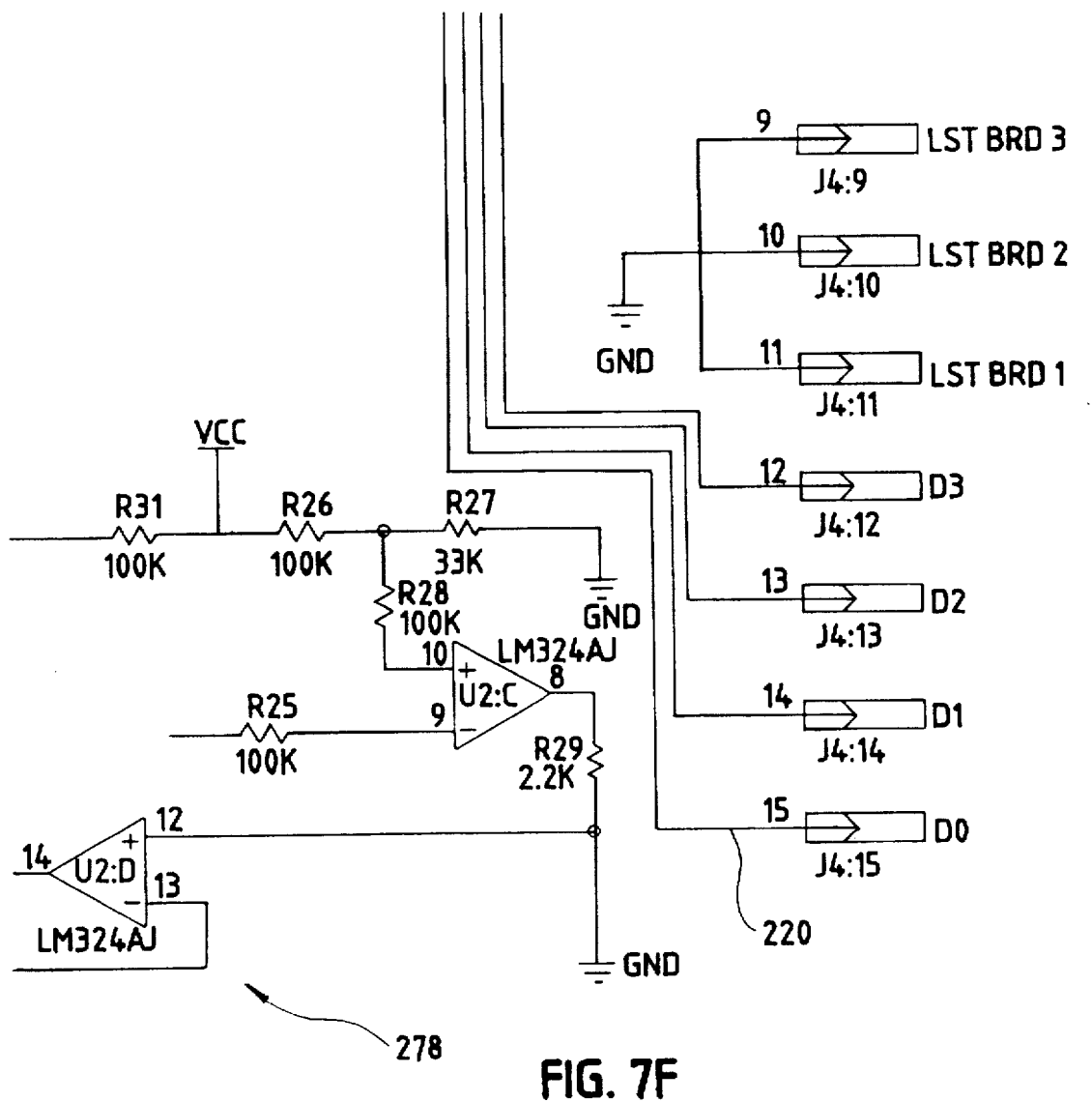

It is certified that error appears in the above-identified patent and that said Letters Patent is hereby corrected as shown below:

Col. 2, ln. 56 delete "FIGS. 7A-7B" and insert therefor -- FIGS. 7A-7F --

Col. 4, ln. 38 delete "and" and insert --an--.

Col. 5, ln. 37 insert "are" after "invention."

Col. 10 ln. 12 delete the first occurrence of "68" and insert therefor --98--.

Col 10, ln. 19 delete "scheduling" and insert therefor -- schedule--.

Col. 10, ln. 65 after "current" insert --programs. In case of a conflict for a particular time, --

Col. 12, ln. 35 delete "that" and insert therefor --than--

UNITED STATES PATENT AND TRADEMARK OFFICE
CERTIFICATE OF CORRECTION

PATENT NO. : 5,748,466
DATED : May 5, 1998
INVENTOR(S) : McGivern et al.

It is certified that error appears in the above-identified patent and that said Letters Patent is hereby corrected as shown below:

Col. 14, ln. 24 delete "is to read" and insert --to be read--

Col. 15, ln. 12 delete first occurrence of "556" and insert therefor --554--.

Col. 15, ln. 37 delete "inFIG." and insert therefor --in FIG. --.

Signed and Sealed this

Eighteenth Day of May, 1999

Attest:

Q. TODD DICKINSON

Attesting Officer

Acting Commissioner of Patents and Trademarks